United States Patent
Sugahara et al.

(10) Patent No.: US 10,920,918 B2
(45) Date of Patent: Feb. 16, 2021

(54) PIPE-MAKING APPARATUS AND PIPE-MAKING METHOD FOR SPIRAL PIPE

(71) Applicant: SEKISUI CHEMICAL CO., LTD., Osaka (JP)

(72) Inventors: Hiroshi Sugahara, Shiga (JP); Tatsurou Baba, Shiga (JP); Yoshirou Sugiyama, Shiga (JP); Masahiro Yamasaki, Tokyo (JP); Junichi Nagatsuka, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 135 days.

(21) Appl. No.: 15/569,314

(22) PCT Filed: Apr. 27, 2016

(86) PCT No.: PCT/JP2016/063199
§ 371 (c)(1),
(2) Date: Oct. 25, 2017

(87) PCT Pub. No.: WO2016/175243
PCT Pub. Date: Nov. 3, 2016

(65) Prior Publication Data
US 2018/0038541 A1 Feb. 8, 2018

(30) Foreign Application Priority Data

Apr. 28, 2015 (JP) .............................. JP2015-091628
Mar. 24, 2016 (JP) .............................. JP2016-059941

(51) Int. Cl.
*F16L 55/162* (2006.01)
*B29C 63/32* (2006.01)
(Continued)

(52) U.S. Cl.
CPC ............ *F16L 55/162* (2013.01); *B29C 63/32* (2013.01); *F16L 1/00* (2013.01); *F16L 55/1655* (2013.01); *F16L 55/18* (2013.01)

(58) Field of Classification Search
CPC ............................... F16L 55/162; B29C 63/32
See application file for complete search history.

(56) References Cited

U.S. PATENT DOCUMENTS 3,601,570 A * 8/1971 Davis .................... B21C 37/124
219/62
4,070,886 A * 1/1978 Nyssen ................. B21C 37/124
72/49

(Continued)

FOREIGN PATENT DOCUMENTS

EP     2 460 643    6/2012
JP     4-244689     9/1992

(Continued)

OTHER PUBLICATIONS

Extended European Search Report dated Nov. 14, 2018 in European Patent Application No. 16786519.5.

(Continued)

*Primary Examiner* — Leith S Shafi
*Assistant Examiner* — Nicholas R Krasnow
(74) *Attorney, Agent, or Firm* — Wenderoth, Lind & Ponack, L.L.P.

(57) ABSTRACT

A spiral pipe (9) is formed by joining edges of adjacent turns of a strip member (90) while helically winding the strip member using a pipe-making apparatus. A propulsive reaction force for moving in a winding direction of the strip member is imparted to a following strip portion (92) or a preceding spiral pipe portion (91) of the strip member by a propulsive reaction force imparting portion of the pipe-making apparatus. The following strip portion follows a preceding spiral pipe portion that has already been made into (Continued)

a pipe. A resisting force in a direction opposite to the propulsive reaction force is imparted to the strip member along the winding direction by a friction between a resisting force imparting portion and the strip member generated while the strip member is moved forward. In this arrangement, a diameter limiting frame can be omitted, and thereby, the pipe-making apparatus can be downsized.

7 Claims, 17 Drawing Sheets

(51) Int. Cl.
*F16L 55/165* (2006.01)
*F16L 55/18* (2006.01)
*F16L 1/00* (2006.01)

(56) References Cited

U.S. PATENT DOCUMENTS

| | | | | | |
|---|---|---|---|---|---|
| 4,436,239 | A | * | 3/1984 | Tsuyama | B23K 31/027 228/145 |
| 4,541,887 | A | * | 9/1985 | Carter | B29C 53/8058 156/431 |
| 4,544,426 | A | * | 10/1985 | Stockman | B28B 19/0038 156/187 |
| 4,567,742 | A | * | 2/1986 | Castricum | B21C 37/124 72/50 |
| 5,074,018 | A | * | 12/1991 | Binggeli | B21C 37/127 29/33 S |
| 5,261,995 | A | * | 11/1993 | Golden | B28B 13/02 156/187 |
| 5,468,322 | A | * | 11/1995 | Menzel | B29C 53/72 156/195 |
| 5,653,898 | A | * | 8/1997 | Yoshie | B23K 26/206 219/121.63 |
| 5,718,103 | A | * | 2/1998 | Spada | B65B 11/32 53/148 |
| 6,164,702 | A | * | 12/2000 | Hauber | B29C 70/32 285/131.1 |
| 6,632,312 | B1 | * | 10/2003 | Katsuyama | B29C 31/002 156/184 |
| 6,773,773 | B2 | * | 8/2004 | Hauber | B29C 53/64 138/172 |
| 2002/0100304 | A1 | * | 8/2002 | Price | B21C 37/121 72/50 |
| 2003/0230127 | A1 | * | 12/2003 | Castricum | B01D 29/111 72/49 |
| 2007/0234770 | A1 | * | 10/2007 | Dickinson | B21C 37/124 72/49 |
| 2010/0008731 | A1 | | 1/2010 | Kakine et al. | |
| 2010/0088882 | A1 | * | 4/2010 | Tomizawa | B21D 7/08 29/564.1 |
| 2010/0184577 | A1 | * | 7/2010 | Nakagaki | B29C 53/785 493/299 |
| 2010/0212803 | A1 | * | 8/2010 | Carr | B29C 63/26 156/60 |
| 2012/0298241 | A1 | * | 11/2012 | Streatfield | F16L 55/1655 138/97 |
| 2013/0252794 | A1 | * | 9/2013 | Yamasaki | B29C 53/78 493/299 |
| 2014/0216225 | A1 | * | 8/2014 | Sohn | D06H 7/10 83/156 |
| 2016/0193684 | A1 | * | 7/2016 | Cho | B23K 9/133 219/137.8 |
| 2017/0191600 | A1 | * | 7/2017 | Kuse | B29C 63/30 |
| 2017/0197353 | A1 | * | 7/2017 | Kuse | B29C 63/32 |
| 2017/0305096 | A1 | * | 10/2017 | Dettori | B26D 1/60 |

FOREIGN PATENT DOCUMENTS

| | | |
|---|---|---|
| JP | 3163054 | 5/2001 |
| JP | 3657056 | 6/2005 |
| JP | 2006-181861 | 7/2006 |
| JP | 2008-126647 | 6/2008 |
| JP | 4505142 | 7/2010 |
| JP | 4866428 | 2/2012 |
| JP | 2015-16580 | 1/2015 |
| WO | 2008/075681 | 6/2008 |

OTHER PUBLICATIONS

Examination Report dated Jun. 28, 2018 in Australian Patent Application No. 2016253716.
International Search Report dated Jul. 19, 2016 in International Application No. PCT/JP2016/063199.
Office Action dated Oct. 30, 2018 in Japanese Patent Application No. 2017-515578, with English-language translation.
International Preliminary Report on Patentability dated Nov. 9, 2017 in International Application No. PCT/JP2016/063199.

* cited by examiner

PIPE-MAKING APPARATUS AND PIPE-MAKING METHOD FOR SPIRAL PIPE

FIELD OF THE INVENTION

The present invention relates to a pipe-making apparatus and a pipe-making method for manufacturing a spiral pipe by spirally winding a strip member, and more particularly to a pipe-making apparatus that does not require an annular frame, a radial frame or the like for limiting a diameter of the spiral pipe and to a pipe-making method using the pipe-making apparatus.

BACKGROUND ART

When an existing pipe such as a water supply pipe, a sewage pipe and a gas pipe becomes aged due to a long-term use, water leakage or gas leakage may occur and the ground may collapse. As a countermeasure therefor, a rehabilitation method of lining a rehabilitation pipe on an inner wall of an existing pipe is known.

For example, Patent Document 1 discloses SPR (Spiral Pipe Renewal) construction method and a pipe-making apparatus for the SPR method as an example of a rehabilitation method. In this pipe-making apparatus, while spirally winding a strip member made of a synthetic resin along an inner wall of an existing pipe, an edge of a preceding spiral pipe portion that has already been formed in a shape of a spiral pipe and an edge of a following strip portion adjacent to one another are joined by concavo-convex fitting. Pipe-making proceeds as the pipe-making apparatus is self-propelled in a spiral manner.

A diameter of a spiral pipe produced by this type of pipe-making method tends to shrink as the pipe-making proceeds. To cope with this problem, in the pipe-making apparatus of Patent Document 1, there is provided an annular frame in which a plurality of guide rollers are annularly arranged along an inner peripheral surface of an existing pipe. The annular frame limits shrinkage of a diameter of the spiral pipe from being reduced in diameter.

Patent Document 2 discloses a radial frame having a plurality of radially extending support arms as diameter shrinkage limiting means. A guide roller at a distal end portion of each support arm is pressed against an inner peripheral surface of a spiral pipe.

PRIOR ART DOCUMENTS

Patent Documents

Patent Document 1: Japanese Patent No. 4866428
Patent Document 2: Japanese Patent No. 4505142

SUMMARY OF THE INVENTION

Problem to be Solved by the Invention

Conventional pipe-making apparatus are increased in size because of diameter limiting frames for limiting diameter shrinkage or the like of the annular frame (Patent Document 1), the radial frame (Patent Document 2) or the like.

In view of the above, it is an object of the present invention to provide an apparatus and a method for pipe-making capable of making a spiral pipe having a desired diameter without a diameter limiting frame.

Solution to the Problem

To solve the problems mentioned above, the present invention provides a pipe-making apparatus for forming a spiral pipe by joining edges of adjacent turns of a strip member while spirally winding the strip member along a winding direction, the apparatus including: a propulsive reaction force imparting portion disposed spaced from a joining step position at which the joining is performed, the propulsive reaction force imparting portion imparting a propulsive reaction force for moving forward in the winding direction of the strip member to a following strip portion or a preceding spiral pipe portion of the strip member, the following strip portion following the preceding spiral pipe portion precedingly made into a pipe; and a resisting force imparting portion disposed spaced from the propulsive reaction force imparting portion, the resisting force imparting portion imparting a resisting force along the winding direction to the strip member by friction with the strip member when the pipe-making apparatus is being propelled by the propulsive reaction force, a direction of the resisting force being opposite to a direction of the propulsive reaction force.

Thereby, a diameter limiting frame can be omitted and the spiral pipe having a desired diameter can be made.

Preferably, the resisting force is set at a magnitude that allows the pipe-making apparatus to be propelled and that allows the preceding spiral pipe portion to change its diameter.

Thereby, the spiral pipe can be surely made while adjusting the diameter of the spiral pipe so as to be a desired diameter.

Preferably, the resisting force of the resisting force imparting portion is adjustable in a stepped fashion or a stepless fashion.

Thereby, the diameter of the spiral pipe can be surely adjusted to be a desired diameter. The diameter changing effect can be increased by increasing the resisting force. The diameter changing effect can be reduced by reducing the resisting force.

Preferably, the propulsive reaction force imparting portion pushes the following strip portion from in front of the joining step position in a direction of movement toward the joining step position, and wherein the resisting force imparting portion imparts the resisting force toward forward in the winding direction to the preceding spiral pipe portion.

Thereby, a diameter-expanding effect can be imparted to the preceding spiral pipe portion. When the preceding spiral pipe portion itself has a tendency to shrink in diameter, the diameter shrinkage can be cancelled out or diminished.

Preferably, the propulsive reaction force imparting portion imparts the propulsive reaction force toward a returning side in the winding direction to the preceding spiral pipe portion, and wherein the resisting force imparting portion imparts the resisting force toward forward in the winding direction to a portion of the preceding spiral pipe portion spaced from the propulsive reaction force imparting portion in the winding direction.

Thereby, both of the propulsive reaction force imparting portion and the resisting force imparting portion can be disposed on the preceding spiral pipe portion. The diameter-expanding effect can be imparted to the preceding spiral pipe portion by disposing the resisting force imparting portion on a returning side (upstream side) in the winding direction with respect to the propulsive reaction force imparting portion. The diameter-shrinking effect can be imparted to the preceding spiral pipe portion by disposing the resisting force imparting portion forward (downstream side) of the propulsive reaction force imparting portion in the winding direction.

Preferably, the propulsive reaction force imparting portion and the resisting force imparting portion are disposed on the same side with each other in the direction of movement with respect to the joining step position.

Thereby, the pipe-making apparatus can be downsized. More preferably, the propulsive reaction force imparting portion and the resisting force imparting portion are disposed in front of the joining step position in the direction of movement.

Preferably, the resisting force imparting portion includes a frictionally slidable member to be frictionally slid against the strip member.

Thereby, the resisting force can be surely imparted to the strip member.

Preferably, the resisting force imparting portion includes a resistive roller, the resisting force being generated as the resistive roller is rotated.

Thereby, the resisting force can be surely imparted to the strip member. Magnitude of the resisting force can be adjusted by rotationally driving the resistive roller in a speed-controllable manner.

Preferably, the pipe-making apparatus further includes a retainer that is held so as to be movable with respect to the preceding spiral pipe portion in the winding direction and immovable with respect to the preceding spiral pipe portion in a width direction orthogonal to the winding direction, wherein the retainer includes a first retainer portion and a second retainer portion spaced from each other in the winding direction.

Thereby, the pipe-making apparatus can be positioned in the width direction with respect to the preceding spiral pipe portion. Moreover, the pipe-making apparatus can be prevented from being rotated even if a rotational moment is applied to the pipe-making apparatus due to an external force from the following strip portion or the like.

The present invention provides a pipe-making method for forming a spiral pipe by joining edges of adjacent turns of a strip member while spirally winding the strip member along a winding direction, the method including steps of: joining the edges of a following strip portion and a preceding spiral pipe portion of the strip member that are adjacent to one another, the following strip portion following the preceding spiral pipe portion that has already been made into a pipe: imparting a propulsive reaction force for moving in the winding direction of the strip member to the following strip portion or to the preceding spiral pipe portion at a position spaced from a joining step position at which the joining is performed; and imparting a resisting force along the winding direction to the strip member at a position spaced from the position for imparting the propulsive reaction force, the resisting force being imparted by friction with the strip member when the pipe-making apparatus is being propelled by the propulsive reaction force, a direction of the resisting force being opposite to a direction of the propulsive reaction force.

Advantageous Effects of the Invention

According to the present invention, a spiral pipe having a desired diameter can be made without a diameter shrinkage limiting frame such as an annular frame or a radial frame. Thereby, a pipe-making apparatus can be downsized.

DESCRIPTION OF THE PREFERRED EMBODIMENTS

Embodiments of the present invention will be described hereinafter with reference to the drawings.

First Embodiment

Figure 1A:
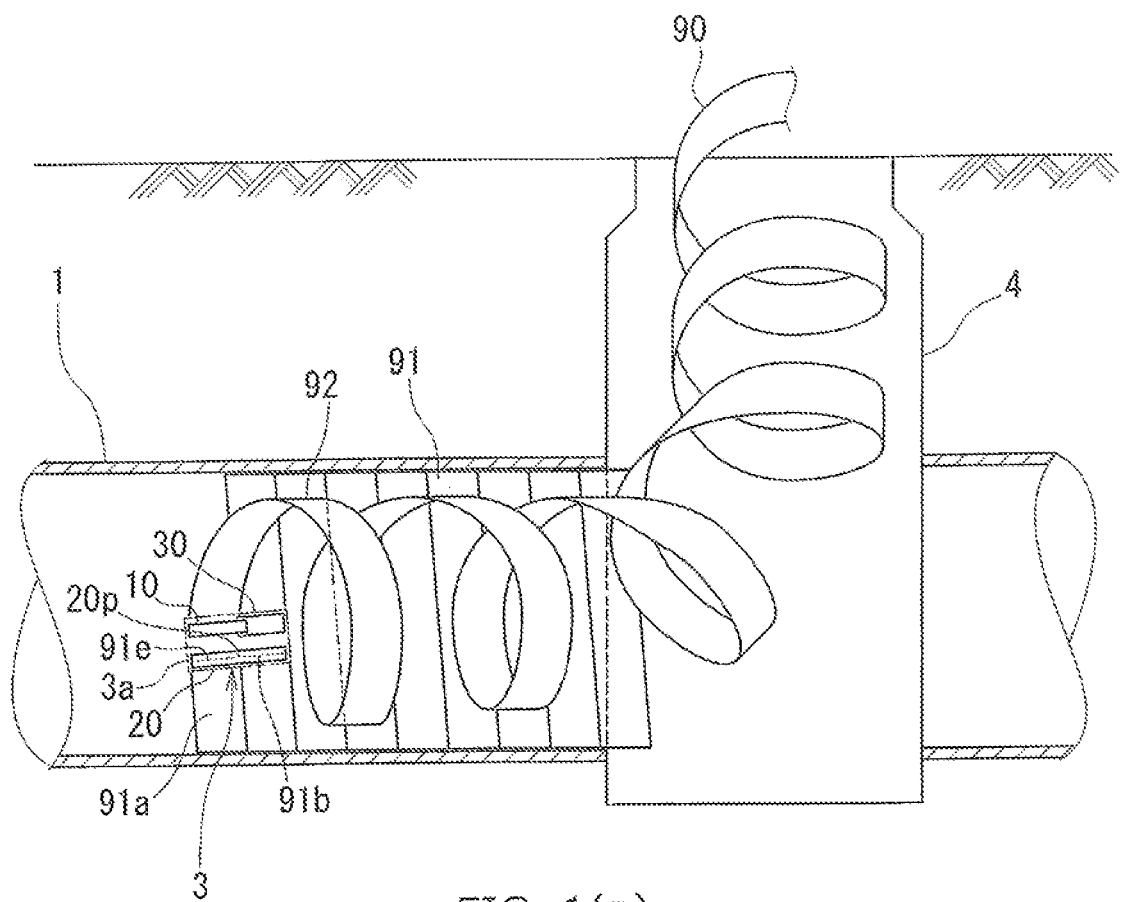
FIG. 1(a) is a cross-sectional view, showing an existing pipe in a process of being rehabilitated using a pipe-making apparatus according to a first embodiment of the present invention.
Figure 1B:
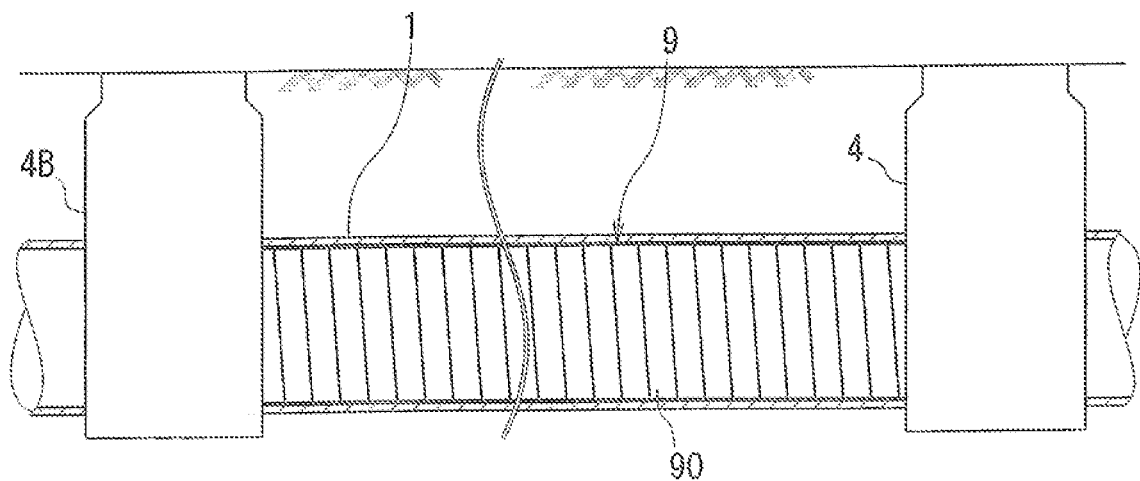
FIG. 1(b) is a cross-sectional view, showing the existing pipe that has completed the rehabilitation work in a scale smaller than that of FIG. 1(a).

FIG. 1(a) shows an aged existing pipe 1 in a process of being rehabilitated. Examples of the existing pipe 1 may include a sewer pipe, a water supply pipe, an agricultural water pipe, a gas pipe, or the like. A rehabilitation pipe 9 (spiral pipe) is lined on an inner wall of the existing pipe 1. As shown in FIG. 1(b), the rehabilitation pipe 9 is provided over an entire length of the existing pipe 1 from a start manhole 4 to an arrival manhole 4B. The rehabilitation pipe 9 is made of a single elongated strip member 90 into a form of a spiral pipe. The strip member 90 is spirally wound and edges of adjacent turns of the strip member 90 are joined. The material of the strip member 90 may be a synthetic resin such as polyvinyl chloride, for example.

Figure 2:
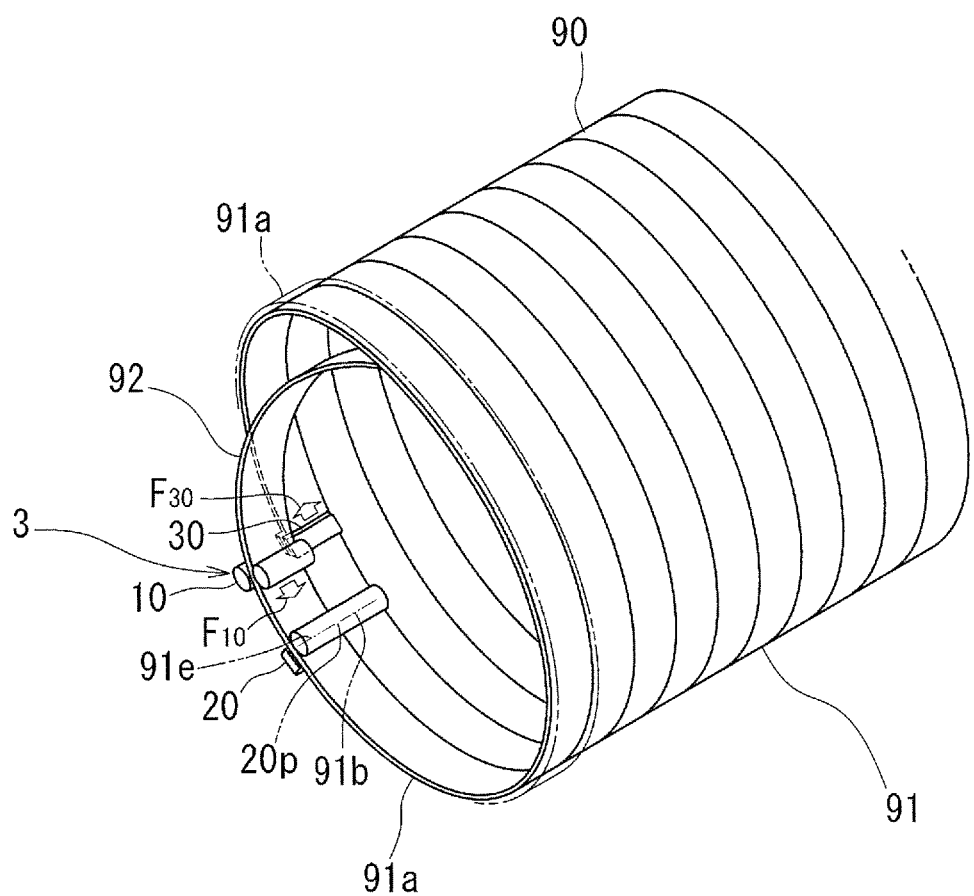
FIG. 2 is a perspective view of a rehabilitation pipe in a process of rehabilitation work according to the first embodiment.

As shown in FIG. 1(a) and FIG. 2, the strip member 90 in a process of pipe-making includes a preceding spiral pipe portion 91 and a following strip portion 92. The preceding spiral pipe portion 91 having a spiral pipe configuration is formed by the strip member 90's being wound in a winding direction that is clockwise in FIG. 2, for example. The preceding spiral pipe portion 91 is disposed along the inner wall of the existing pipe 1 from and end portion of the existing pipe 1 on the start manhole 4 side (right side in FIG. 1(a)).

The following strip portion 92 that has not yet been made into a pipe continues from an end portion (portion continuing to the following strip portion) 91e of the preceding spiral pipe portion 91 on a downstream side in the winding direction. The following strip portion 92 is passed through an inside of the preceding spiral pipe portion 91 and an inside of the start manhole 4.

Figure 4A:
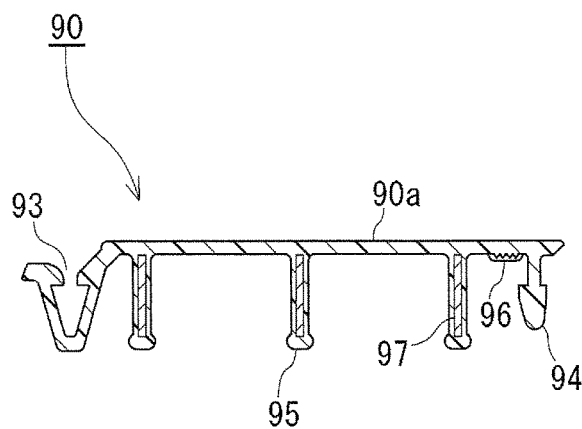
FIG. 4(a) is a cross-sectional view of a strip member that is a structural component of the rehabilitation pipe.

As shown in FIG. 4(a), the strip member 90 includes a flat strip body 90a, a pair of fitting portions 93, 94 and three (plural) reinforcement ribs 95. A front side surface of the strip body 90a is oriented to an inner peripheral side (upper side in FIG. 4(b)) of the preceding spiral pipe portion 91, and thereby the rehabilitation pipe 9. A back side surface of the strip body 90a is oriented to an outer peripheral side (under side in FIG. 4(b)) of the preceding spiral pipe portion 91, and thereby the rehabilitation pipe 9.

Figure 4B:
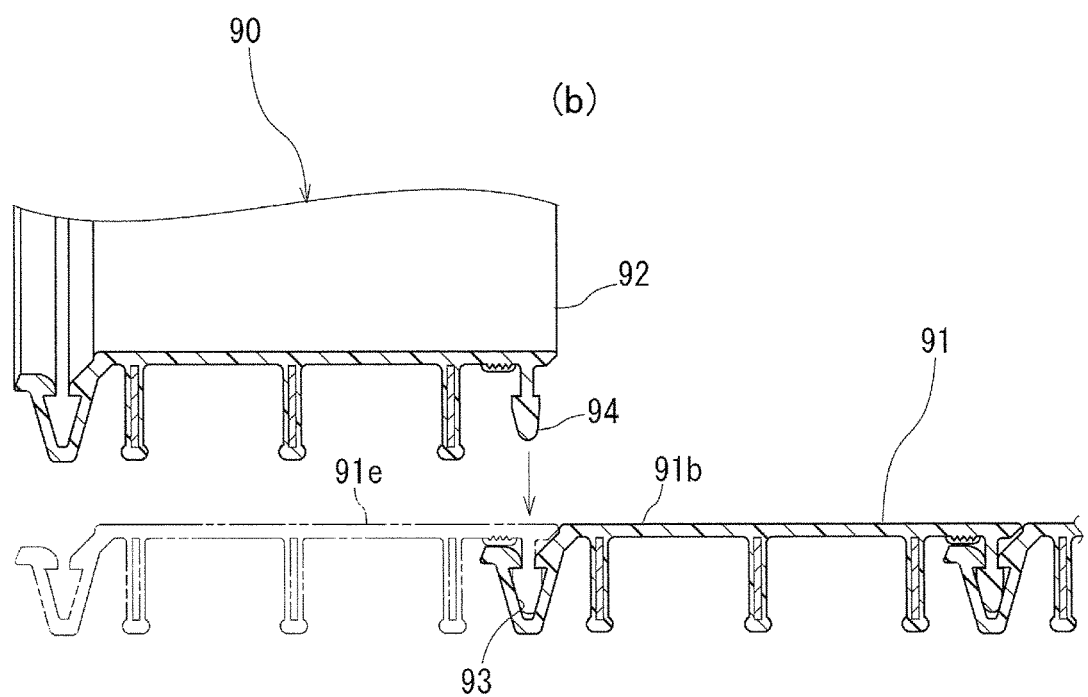
FIG. 4(b) is a cross-sectional view taken along line IVb-IVb of FIG. 3.

A first fitting portion 93 is formed in an edge portion of the strip body 90a on one side (left side in FIG. 4(b)) in a width direction. The first fitting portion 93 is recessed from the front side surface (top surface in FIG. 4(b)) of the strip body 90a in a concave groove configuration. A second fitting portion 94 is formed in an edge portion of the strip body 90a on the other side (right side in FIG. 4(b)) in the width direction. The second fitting portion 94 is formed in a convex ridge configuration protruded from the back side surface (bottom surface in FIG. 4(b)) of the strip body 90a. As shown in FIG. 4(b), the fitting portions 93, 94 of adjacent turns of the preceding spiral pipe portion 91, and thereby of the rehabilitation pipe 9 (FIG. 1(b)) are joined in a concave-convex fitting.

A sealing agent 96 is provided on the back side surface of the strip body 90a near the second fitting portion 94. The three reinforcement ribs 95 are formed parallel to one another in the back side surface of the strip body 90a. A reinforcement strip 97 made of a steel sheet or the like is embedded in the reinforcement rib 95.

The fitting portions 93, 94 and the reinforcement ribs 95 or the like of the strip member 90 are not shown in FIG. 1(a) and FIG. 2.

As shown in FIG. 1(a) and FIG. 2, a pipe-making apparatus 3 is disposed in a distal end portion (left end portion in FIG. 1(a)) of the preceding spiral pipe portion 91 in an extending direction. The pipe-making apparatus 3 is moved forward (self-propelled) along the winding direction (clockwise direction in FIG. 2) of the preceding spiral pipe portion 91. A width direction orthogonal to a direction of movement of the pipe-making apparatus 3 is inclined to an axis of the existing pipe 1 through an angle corresponding to a lead angle of the preceding spiral pipe portion 91. The strip member 90 is made into the rehabilitation pipe 9 by the pipe-making apparatus 3. A joining step position 20p is set in the pipe-making apparatus 3. The concave-convex fitting (joining) job is performed at the joining step position 20p.

Figure 3:
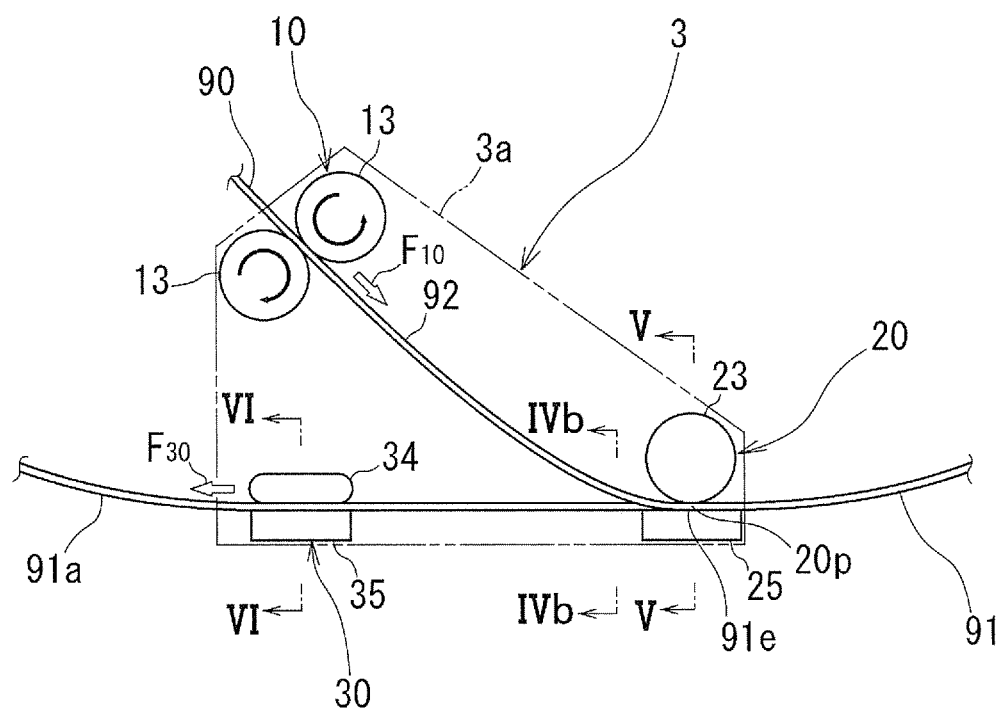
FIG. 3 is a front view diagrammatically showing the pipe-making apparatus of the first embodiment.

As shown in FIG. 1(a) and FIG. 3, the pipe-making apparatus 3 includes a body frame 3a, a propulsive reaction force imparting portion 10, a fitting force imparting portion 20 (joining portion) and a resisting force imparting portion 30. The three force imparting portions 10, 20, 30 are disposed spaced from one another. The fitting force imparting portion 20 is disposed at the joining step position 20p and the propulsive reaction force imparting portion 10 and the resisting force imparting portion 30 are disposed spaced from the joining step position 20p. Relative positions of the force imparting portions 10, 20, 30 are fixed by the body frame 3a diagrammatically shown in the drawings in chain double-dashed lines.

As shown in FIG. 3, the propulsive reaction force imparting portion 10 is disposed spaced from the joining step position 20p. Specifically, the propulsive reaction force imparting portion 10 is located in front of the joining step position 20p (left side in FIG. 3) in the direction of movement of the pipe-making apparatus 3 and interior (upper side in FIG. 3) to the joining step position 20p in a radial direction of the preceding spiral pipe portion 91 and the existing pipe 1. The propulsive reaction force imparting portion 10 has a pair of propelling rollers 13, 13. An axis of the propelling roller 13 is oriented to the width direction of the pipe-making apparatus 3 (direction orthogonal to the plane of FIG. 3). The following strip portion 92 is caught between the pair of propelling rollers 13, 13 from an inner peripheral side (front side) and an outer peripheral side (back side). A rotational drive mechanism (not shown) such as a motor is connected to at least one of the propelling rollers 13, 13. The propelling roller 13 is rotationally driven about its own axis by the rotational drive mechanism so as to push the following strip portion 92 toward the joining step position 20p.

Figure 5:
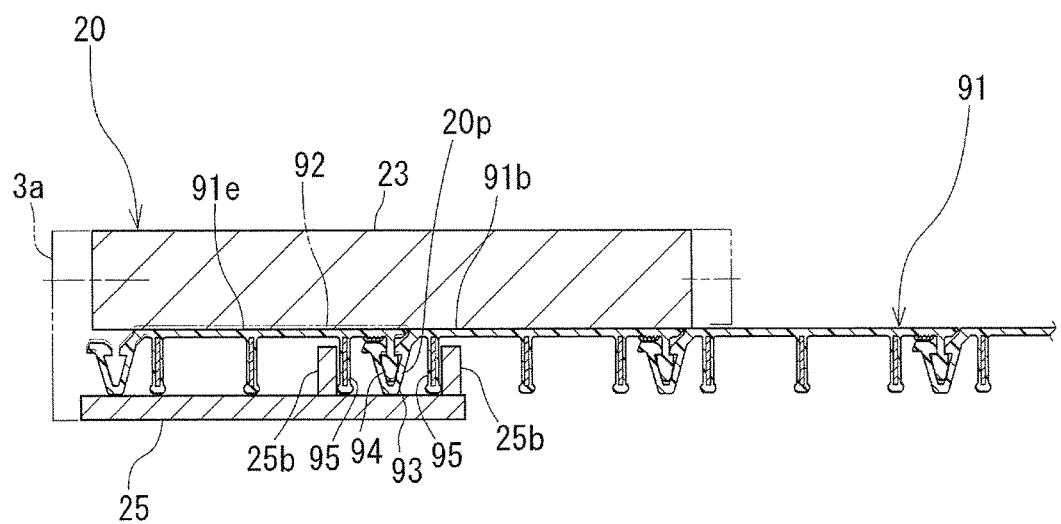
FIG. 5 is a cross-sectional view of a fitting force imparting portion of the pipe-making apparatus taken along line V-V of FIG. 3.

As shown in FIGS. 3 and 5, the fitting force imparting portion 20 includes a fitting roller 23 and a fitting receiver 25. The fitting roller 23 is disposed on an inner peripheral side (upper side in FIG. 3) of the preceding spiral pipe portion 91. An axis of the fitting roller 23 is oriented to the width direction of the pipe-making apparatus 3 (direction orthogonal to the plane of FIG. 3) in parallel to the axis of the propelling roller 13. The fitting roller 23 is freely rotatable about its own axis. It is not required that the fitting roller 23 should be connected to a rotational drive mechanism such as a motor.

As shown in FIG. 5, the fitting receiver 25 has a configuration of a plate. The fitting receiver 25 is disposed on the outer peripheral side (under side in FIG. 3) of the preceding spiral pipe portion 91. The fitting receiver 25 is opposed to the fitting roller 23 so as to be spaced from each other in the radial direction of the preceding spiral pipe portion 91. The joining step position 20p is located between the fitting roller 23 and the fitting receiver 25.

As shown in FIG. 3, the following strip portion 92 extends diagonally outwardly with respect to the radial direction of the preceding spiral pipe portion 91 from the propulsive reaction force imparting portion 10 toward the fitting force imparting portion 20. The following strip portion 92 is inserted between the fitting roller 23 and the fitting receiver 25 at the joining step position 20p. As shown in FIGS. 3 and 5, the second fitting portion 94 of the following strip portion 92 is pressed into and fitted into the first fitting portion 93 of an adjacent turn portion 91b of the preceding spiral pipe portion 91 by the fitting roller 23 and the fitting receiver 25, the first fitting portion 93 being located before the second fitting portion 94 in the winding direction by one turn.

As shown in FIG. 5, the fitting receiver 25 is provided with two (plural) first retainer portions 25b. The first retainer portion 25b is formed in a configuration of a plate orthogonal to the fitting receiver 25. The first retainer portion 25b is protruded from the fitting receiver 25 toward the fitting roller 23 and extends in the direction of movement of the pipe-making apparatus 3 (direction orthogonal to the plane of FIG. 5). The two first retainer portions 25b are arranged in the width direction of the pipe-making apparatus 3 (right-left direction in FIG. 5). The first retainer portion 25b is held so as to be movable with respect to the preceding spiral pipe portion 91 in the winding direction (direction orthogonal to the plane of FIG. 5) and immovable in the width direction (right-left direction in FIG. 5). The first retainer portion 25b on one side (left side in FIG. 5) is abutted against one of the reinforcement ribs 95 from a side of a distal end of the preceding spiral pipe portion 91 in the extending direction (left side in FIG. 5). The first retainer portion 25b on the other side (right side in FIG. 5) is abutted against another of the reinforcement ribs 95 from a side of a basal end of the preceding spiral pipe portion 91 in the extending direction (right side in FIG. 5).

Figure 6:
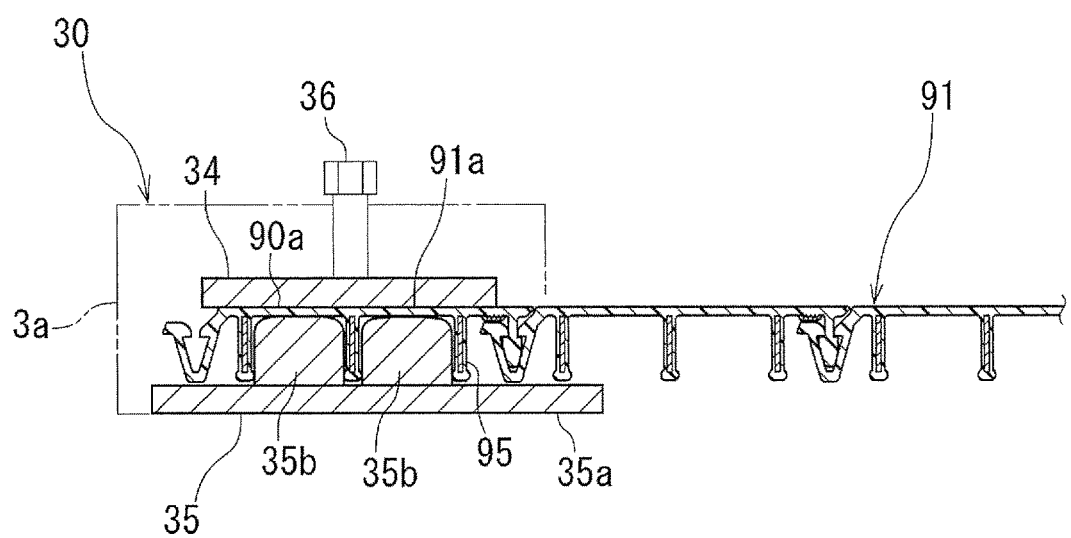
FIG. 6 is a cross-sectional view of a resisting force imparting portion of the pipe-making apparatus taken along line VI-VI of FIG. 3.

As shown in FIGS. 3 and 6, the resisting force imparting portion 30 is disposed in a distal one-turn portion 91a of the preceding spiral pipe portion 91 extending between the following strip portion 91e and the adjacent turn portion 91b. At the same time, the resisting force imparting portion 30 is disposed spaced from the joining step position 20p on the same side as the propulsive reaction force imparting portion 10 in the direction of movement. Preferably, the resisting force imparting portion 30 is disposed spaced from the joining step position 20p in front of the joining step position 20p in the direction of movement (left side in FIG. 5).

Moreover, the resisting force imparting portion 30 is disposed on a returning side (upstream side) with respect to the propulsive reaction force imparting portion 10 in the winding direction of the strip member 90.

As shown in FIG. 6, the resisting force imparting portion 30 has frictionally slidable members 34, 35 and a resisting force adjustment bolt 36. The preceding spiral pipe portion 91 is caught between the frictionally slidable members 34, 35 respectively from the inner peripheral side and the outer peripheral side thereof. The frictionally slidable member 34 on the inner peripheral side has a plate configuration. A length of the frictionally slidable member 34 along the width direction of the pipe-making apparatus 3 (right-left direction in FIG. 5) is generally the same as or slightly shorter than a width of the strip member 90. The frictionally slidable member 34 is disposed on the inner peripheral side of the preceding spiral pipe portion 91.

As shown in FIG. 6, the frictionally slidable member 35 on the outer peripheral side is disposed on the outer peripheral side of the preceding spiral pipe portion 91. The frictionally slidable member 35 on the outer peripheral side includes a base plate 35a and two (plural) frictionally slidable blocks 35b, 35b. The base plate 35a is disposed so as to be laid over the reinforcement ribs 95 and the first fitting portion 93 of the distal one-turn portion 91a of the preceding spiral pipe portion 91.

As shown in FIG. 6, the frictionally slidable blocks 35b are disposed on a surface (upper surface in FIG. 6) of the base plate 35a facing the frictionally slidable member 34. The frictionally slidable block 35b has a quadrangular cross-sectional configuration and extends in the direction of movement of the pipe-making apparatus 3 (direction orthogonal to the plane of FIG. 6). Each of the frictionally slidable blocks 35b is fitted between the two reinforcement ribs 95 of the preceding spiral pipe portion 91. A surface (upper surface in FIG. 6) of the frictionally slidable block 35b facing the frictionally slidable member 34 is abutted against a back surface (under surface in FIG. 6) of the strip body 90a of the preceding spiral pipe portion 91.

Opposite side surfaces of the frictionally slidable block 35b in a width direction (right-left direction in FIG. 6) are respectively abutted against the reinforcement ribs 95. Thereby, the frictionally slidable block 35b is held so as to be movable with respect to the preceding spiral pipe portion 91 in the winding direction (direction orthogonal to the plane of FIG. 6) and immovable in the width direction. The frictionally slidable blocks 35b constitute a "second retainer portion".

As shown in FIG. 3, the frictionally slidable blocks 35b, i.e. the second retainer portion 35b and the first retainer portion 25b are disposed spaced from each other in the direction of movement of the pipe-making apparatus 3 (winding direction of the preceding spiral pipe portion 91). The retainer portions 25b, 35b constitute "retainer".

As diagrammatically shown in FIG. 6, the body frame 3a is provided with the resisting force adjustment bolt 36 (resisting force adjustment means). By screwing the resisting force adjustment bolt 36, the frictionally slidable member 34 is abutted against an inner peripheral surface of the strip body 90a of the preceding spiral pipe portion 91. A pressing force is applied to the frictionally slidable member 35 on the outer peripheral side.

The rehabilitation pipe 9 is made in the following manner by the pipe-making apparatus 3.

It is premised that the preceding spiral pipe portion 91 has been formed to some extent along the inner wall of the existing pipe 1 as shown in FIG. 1(a).

<Feeding of the Strip Member 90>

The strip member 90 (following strip portion 92) is introduced into the pipe-making apparatus 3 from the start manhole 4 via an inside of the preceding spiral pipe portion 91. Preferably, the following strip portion 92 is curled beforehand. Thereby, the following strip portion 92 can be easily put into the inside of the preceding spiral pipe portion 91 and can be easily introduced into the pipe-making apparatus 3.

<Propelling Step>

As shown in FIG. 3, the following strip portion 92 is pushed toward the joining step position 20p by rotationally driving the propelling roller 13 of the propulsive reaction force imparting portion 10. Specifically, the following strip portion 92 is pushed from in front (left side in FIG. 3) of the joining step position 20p in the direction of movement toward the upstream side (returning side) in the winding direction of the strip member 90. Thereby, a propulsive reaction force $F_{10}$ for the pipe-making apparatus 3 to move forward in the winding direction can be obtained. By the propulsive reaction force $F_{10}$, the pipe-making apparatus 3 can be moved forward (self-propelled) in the left direction in FIG. 3 with respect to the preceding spiral pipe portion 91 that is fixed, and thereby the pipe-making apparatus 3 can be moved forward (self-propelled) in the clockwise direction in FIG. 2.

<Joining Step>

As the pipe-making apparatus 3 moves forward, the following strip portion 92 is successively fed between the fitting roller 23 and the fitting receiver 25 (joining step position 20p) of the fitting force imparting portion 20. Then the second fitting portion 94 of the following strip portion 92 is pressed into the first fitting portion 93 of the adjacent turn portion 91b of the preceding spiral pipe portion 91 by the fitting roller 23 and the fitting receiver 25. Thereby, as shown in chain double-dashed lines in FIG. 4(b), the second fitting portion 94 of the following strip portion 92, thereby of the portion continuing to the following strip portion 91e, is fitted into the first fitting portion 93 of the adjacent turn portion 91b. In this manner, while the strip member 90 is spirally wound, edges of adjacent turns of the strip member 90 are joined.

At this time, a diameter of the preceding spiral pipe portion 91 tends to shrink. The causes thereof may include the following strip portion 92 being bent to a relatively great degree when being introduced to the pipe-making apparatus 3 and the following strip portion 92 being curled.

<Resisting Force Imparting Step>

As the pipe-making apparatus 3 moves forward, the frictionally slidable members 34, 35 of the resisting force imparting portion 30 is frictionally slid along the preceding spiral pipe portion 91 and sliding friction is generated between the resisting force imparting portion 30 and the preceding spiral pipe portion 91. Thereby, resisting force $F_{30}$ toward forward in the winding direction is imparted from the resisting force imparting portion 30 to the preceding spiral pipe portion 91. Direction of the resisting force $F_{30}$ is opposite to the direction of the propulsive reaction force $F_{10}$ along the winding direction. An imparting position of the resisting force $F_{30}$ is on the upstream side (returning side) in the winding direction of the strip member 90 with respect to an imparting position of the propulsive reaction force $F_{10}$. As a result, as indicated by the chain double-dashed lines in FIG. 2, a diameter-expanding effect works on the preceding spiral pipe portion 91. Mechanism of the diameter-expanding effect may be that a compressive stress is generated in a portion of the following strip portion 92 between the propulsive reaction force imparting portion 10 and the fitting force imparting portion 20 and the compressive stress is released in the distal one-turn portion 91a. Alternatively, since a distance the pipe-making apparatus 3 is actually moved forward is shorter than a rotated distance of the propelling roller 13, the following strip portion 92 may be slid toward the joining step position 20p through a distance corresponding to a difference between the distance the pipe-making apparatus 3 is moved forward and the rotated distance of the propelling roller 13.

Preferably, a magnitude of the resisting force $F_{30}$ may be set so as to allow the pipe-making apparatus 3 to move forward and at the same time to allow the preceding spiral pipe portion 91 to expand the diameter thereof (diameter-variable).

A diameter-shrinking effect of the preceding spiral pipe portion 91 itself may be counter-vailed or diminished by the diameter-expanding effect mentioned above. Thereby, the diameter of the preceding spiral pipe portion 91 may be maintained constant or an amount of shrinkage may be reduced. Moreover, by making the diameter-expanding effect greater than the diameter-shrinking effect, the preceding spiral pipe portion 91 can be pressed strongly against the inner wall of the existing pipe 1. The chain double-dashed lines in FIG. 2 indicate the preceding spiral pipe portion 91 in a diameter-expanded state assuming that the preceding spiral pipe portion 91 is not restricted by the existing pipe 1.

Therefore, a diameter shrinkage limiting frame such as the annular frame of Patent Document 1 and the radial frame of Patent Document 2 is not required. In other words, it is not required for the body frame 3a to have an annular configuration extending along the inner wall of the existing pipe 1 or to radially extend toward the inner wall of the existing pipe 1. As a result, the pipe-making apparatus 3 can be downsized.

Since the propulsive reaction force imparting portion 10 and the resisting force imparting portion 30 are disposed on the same side with respect to the fitting force imparting portion 20, and thereby the joining step position 20p in the direction of movement of the pipe-making apparatus 3 (circumferential direction of the preceding spiral pipe portion 91), the pipe-making apparatus 3 can be further downsized. As a result, even if an inner diameter of the existing pipe 1 is small, or even if the existing pipe 1 has an irregular cross-section portion having a steeply curving (large curvature) portion such as an angular portion or a bent portion, such existing pipe can be sufficiently treated and the rehabilitation pipe 9 can be surely lined along an inner peripheral surface of the existing pipe 1.

By adjusting the pressing force of the resisting force adjustment bolt 36 against the preceding spiral pipe portion 91 of the frictionally slidable member 34, the magnitude of the resisting force $F_{30}$ can be adjusted. By adjusting a threaded amount of the resisting force adjustment bolt 36, the magnitude of the resisting force $F_{30}$ can be set at any value in a stepless fashion.

By setting the resisting force $F_{30}$ high, the diameter-expanding effect can be enhanced. By setting the resisting force $F_{30}$ low, the diameter-expanding effect can be reduced. Thereby, the rehabilitation pipe 9 can be expanded or shrink according to changes of the inner diameter of the existing pipe 1 such as when the inner diameter of the existing pipe 1 changes depending on a position in an axial direction. When the inner wall of the existing pipe 1 has a raised portion such as a protrusion or a depressed portion, the rehabilitation pipe 9 can be expanded or shrink to accommodate such portion.

Since the following strip portion 92 is introduced to the propulsive reaction force imparting portion 10 via the inside of the preceding spiral pipe portion 91 in a twisted manner as shown in FIG. 1, the propulsive reaction force imparting portion 10 is subjected to a force from the following strip portion 92 that pulls the propulsive reaction force imparting portion 10 toward the start manhole 4 (right side in FIG. 1). As a result, a rotation moment, for example in the clockwise direction in FIG. 1, works on the pipe-making apparatus 3. However, the pipe-making apparatus 3 can be prevented from being rotated with respect to the preceding spiral pipe portion 91 by the abutment of the first retainer portion 25b against the reinforcement rib 95 and the abutment of the frictionally slidable block 35b (second retainer portion) against the reinforcement rib 95.

Furthermore, the pipe-making apparatus 3 can be positioned in an axial direction of the preceding spiral pipe portion 91 (right-left direction in FIGS. 5 and 6) by the abutment of the retainer portions 25b, 35b against the reinforcement ribs 95.

Other embodiments of the present invention will be described hereinafter. In the description of these embodiments, same reference numerals will be used to indicate features same as those of foregoing embodiments, and explanation thereof will be omitted.

Second Embodiment

Figure 7:
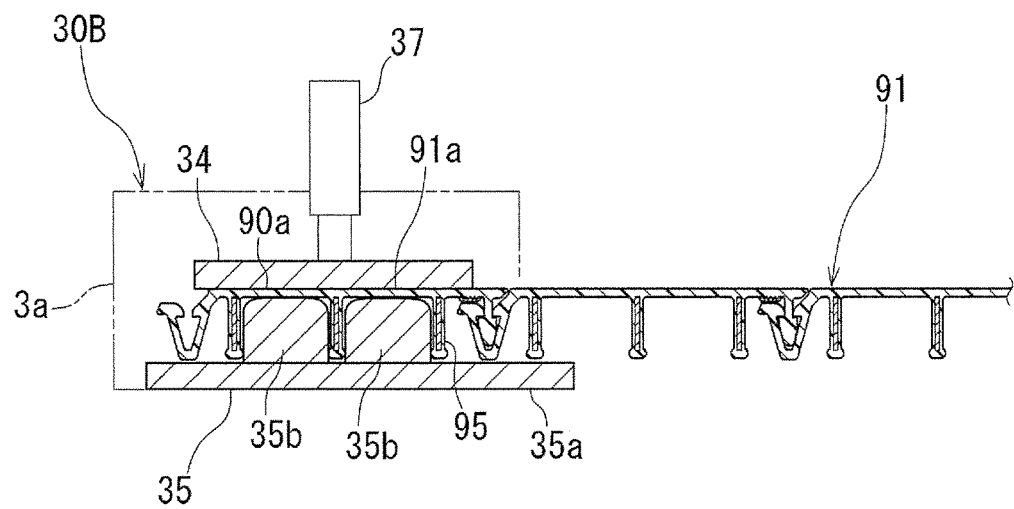
FIG. 7 is a cross-sectional view of a resisting force imparting portion of a pipe-making apparatus according to a second embodiment of the present invention.

FIG. 7 shows a second embodiment of the present invention. In the second embodiment, in place of the resisting force adjustment bolt 36, a fluid pressure cylinder 37 is provided as a resisting force adjustment means of a resisting force imparting portion 30B. The fluid pressure cylinder 37 may be a hydraulic cylinder or may be a pneumatic cylinder. By pressing a frictionally slidable member 34 against a preceding spiral pipe portion 91 by the fluid pressure cylinder 37, a resisting force $F_{30}$ can be generated. By adjusting an output of the fluid pressure cylinder 37, magnitude of the resisting force $F_{30}$ can be adjusted in a stepped fashion or in a stepless fashion. The magnitude of the resisting force $F_{30}$ can also be adjusted by remote control.

For example, the output of the fluid pressure cylinder 37, thereby the magnitude of the resisting force $F_{30}$ may be set in a two-step selection of a value at which a diameter of the preceding spiral pipe portion 91 is expanded and a value at which the diameter of the preceding spiral pipe portion 91 is maintained constant taking into account a diameter-shrinking effect of the preceding spiral pipe portion 91 itself. Alternatively, the output of the fluid pressure cylinder 37, thereby the magnitude of the resisting force $F_{30}$ may be set in a two-step selection of the value at which the diameter of the preceding spiral pipe portion 91 is maintained constant and a value at which the diameter of the preceding spiral pipe portion 91 shrinks. Alternatively, the output of the fluid pressure cylinder 37, thereby the magnitude of the resisting force $F_{30}$ may be set in a three-step selection of the value at which the diameter of the preceding spiral pipe portion 91 is expanded, the value at which the diameter of the preceding spiral pipe portion 91 is maintained constant and the value at which the diameter of the preceding spiral pipe portion 91 shrinks. Furthermore, the output of the fluid pressure cylinder 37 may be stopped, and the magnitude of the resisting force $F_{30}$ may be brought to zero.

Thereby, a rehabilitation pipe 9 can be surely expanded or shrink according to changes of an inner diameter of an existing pipe 1 or a raised portion or a depressed portion or the like of the existing pipe 1.

Third Embodiment

Figure 8:
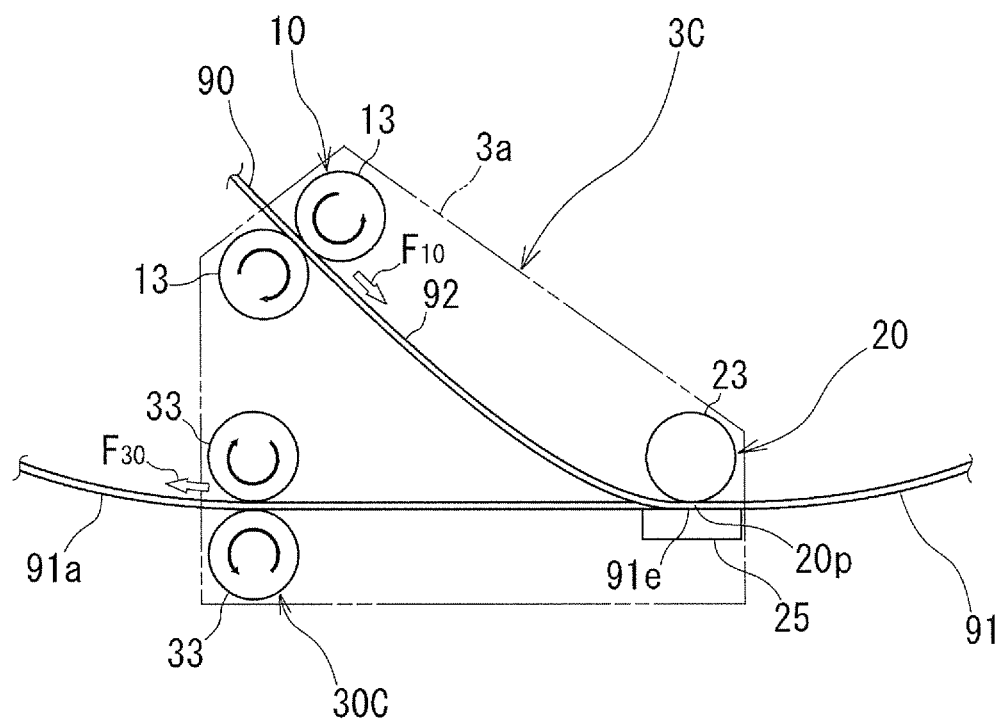
FIG. 8 is a front view diagrammatically showing a pipe-making apparatus according to a third embodiment of the present invention.

FIG. 8 shows a third embodiment of the present invention. In a pipe-making apparatus 3C according to the third embodiment, a resisting force imparting portion 30C is composed of a pair of resistive rollers 33, 33. The resistive rollers 33, 33 and thereby the resisting force imparting portion 30C are disposed in a similar position to the resisting force imparting portion 30 of the first embodiment (FIG. 3). An axis of the resistive roller 33 is oriented in a width direction of the pipe-making apparatus 3C (direction orthogonal to the plane of FIG. 8) in parallel to an axis of propelling rollers 13. A preceding spiral pipe portion 91 is caught between the resistive rollers 33, 33 from an inner peripheral side and an outer peripheral side. A rotational drive mechanism (not shown) such as a motor is connected to at least one of the resistive rollers 33, 33. The resistive roller 33 is rotationally driven by the rotational drive mechanism in a direction opposite to the propelling roller 13. Thereby, a resisting force $F_{30}$ toward forward in a winding direction (leftward in FIG. 3) is imparted to a distal one-turn portion 91a of the preceding spiral pipe portion 91. A diameter-expanding effect can be imparted to the preceding spiral pipe portion 91 by the resisting force $F_{30}$ and by the propulsive reaction force $F_{10}$ to a following strip portion 92 by the propelling roller 13. The resisting force $F_{30}$ can be increased or decreased by adjusting a number of rotation of the resistive roller 33, etc. Thereby, the diameter-expanding effect can be enhanced or reduced.

The resistive roller 33 may be freely rotated by contact with the preceding spiral pipe portion 91 and a frictional resistance generator may be disposed in a rotary shaft or other portion of the resistive roller 33. In this case, the rotational drive mechanism for the resistive roller 33 may be omitted.

Though not shown in detail, the pipe-making apparatus 3C may be positioned in a width direction of the distal one-turn portion 91a (direction orthogonal to the plane of FIG. 8) by abutting an end surface of the resistive roller 33 on an outer peripheral side (under side in FIG. 8) against an enforcement rib 95 of the preceding spiral pipe portion 91 or by providing the resistive roller 33 with a flange and abutting the flange against the enforcement rib 95.

Fourth Embodiment

Figure 9:
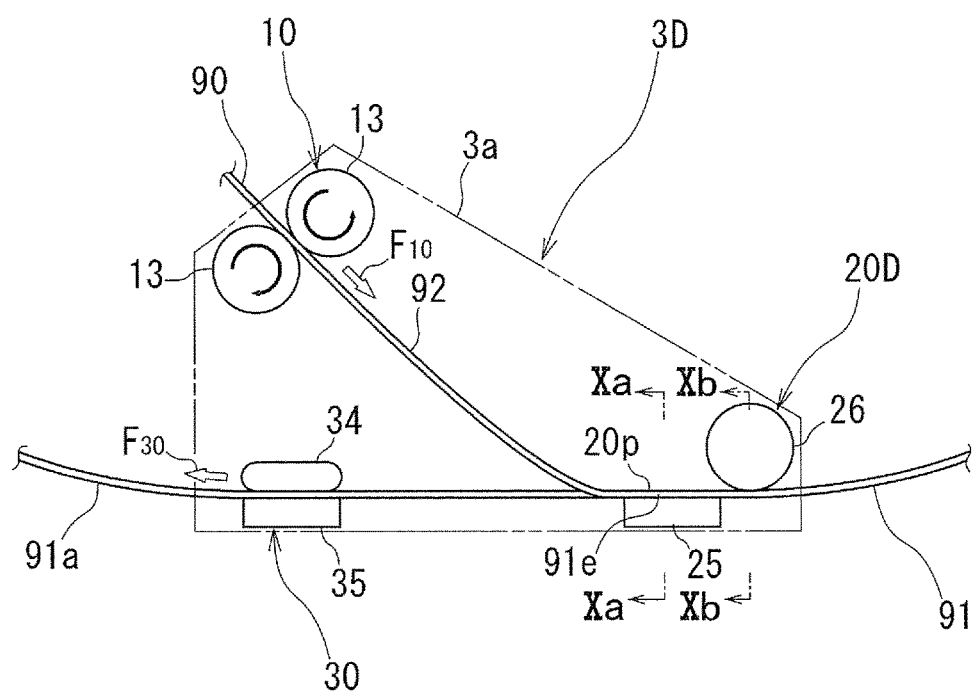
FIG. 9 is a front view diagrammatically showing a pipe-making apparatus according to a fourth embodiment of the present invention.

FIGS. 9 and 10 show a fourth embodiment of the present invention. In a pipe-making apparatus 3D according to the fourth embodiment, a fitting roller 23 (FIG. 3) is omitted from a joining portion 20D and a fitting assistive roller 26 is provided in place of the fitting roller 23. The fitting assistive roller 26 is disposed on an inner peripheral side of a preceding spiral pipe portion 91 at a position shifted rearward with respect to a fitting receiver 25 in a direction of movement (right side in FIG. 9) of a pipe-making apparatus 3. An axis of the fitting assistive roller 26 is oriented to a width direction of the pipe-making apparatus 3D (direction orthogonal to the plane of FIG. 9) in parallel to an axis of a propelling roller 13. The fitting assistive roller 26 is freely rotatable about its own axis. It is not required that the fitting assistive roller 26 should be connected to a rotational drive mechanism such as a motor.

In the pipe-making apparatus 3D of the fourth embodiment, as with the first embodiment, when the propelling roller 13 is rotationally driven, a following strip portion 92 is pressed toward a joining step position 20p in the fitting receiver 25. As indicated by solid lines in FIG. 10(a), a second fitting portion 94 of the following strip portion 92 and a first fitting portion 93 of an adjacent turn portion 91b of the preceding spiral pipe portion 91 can be fitted.

Figure 10A:
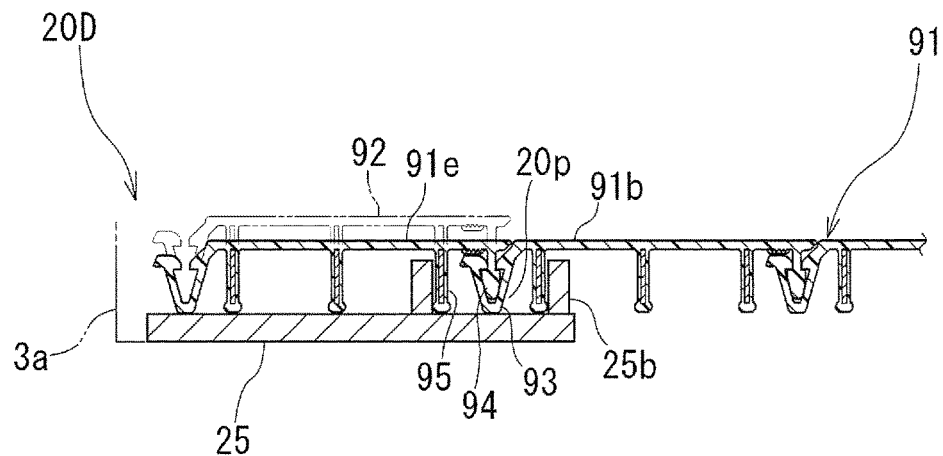
FIG. 10(a) is a cross-sectional view of a joining portion of the pipe-making apparatus according to the fourth embodiment, taken along line Xa-Xa of FIG. 9.
Figure 10B:
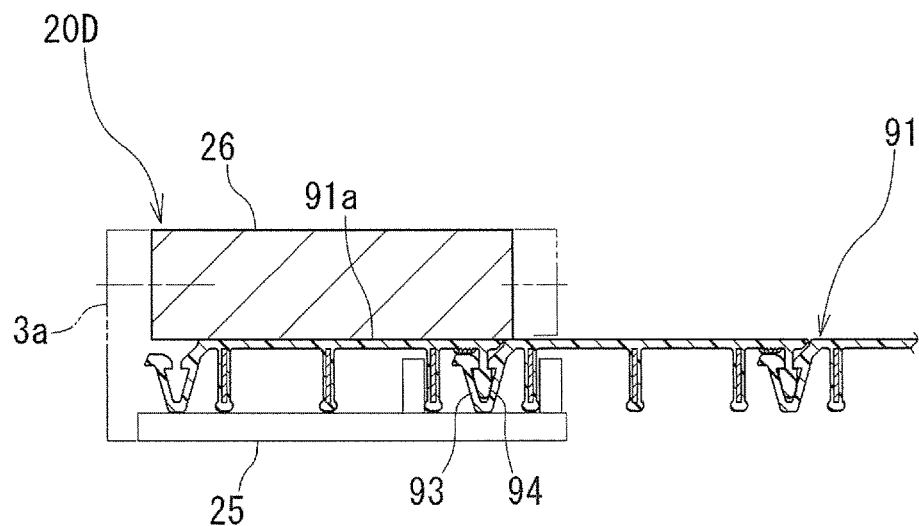
FIG. 10(b) is a cross-sectional view of the joining portion of the pipe-making apparatus according to the fourth embodiment, taken along line Xb-Xb of FIG. 9.

Then, as shown in FIG. 10(b), a distal one-turn portion 91a shifted from the following strip portion 92 is pressed toward an outer peripheral side (downward in FIG. 10(b)) by the fitting assistive roller 26. Thereby, as indicated by chain double-dashed lined in FIG. 10(a), even when the fitting in the fitting receiver 25 is not sufficient, the fitting portions 93, 94 can be securely fitted by the fitting assistive roller 26.

When the fitting portions 93, 94 are securely fitted in the fitting receiver 25 (solid lines in FIG. 10(a)), the fitting assistive roller 26 may be omitted.

In the present invention, not only a diameter-expanding effect but also a diameter-shrinking effect can be imparted to the preceding spiral pipe portion 91.

Fifth Embodiment

Figure 11:
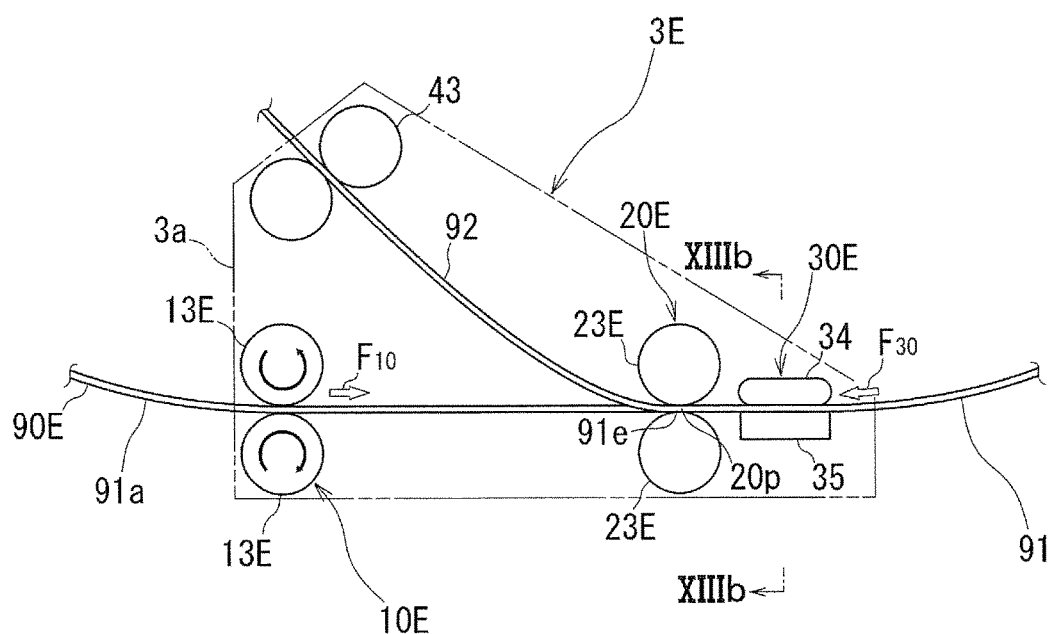
FIG. 11 is a front view diagrammatically showing a pipe-making apparatus according to a fifth embodiment of the present invention.
Figure 12:
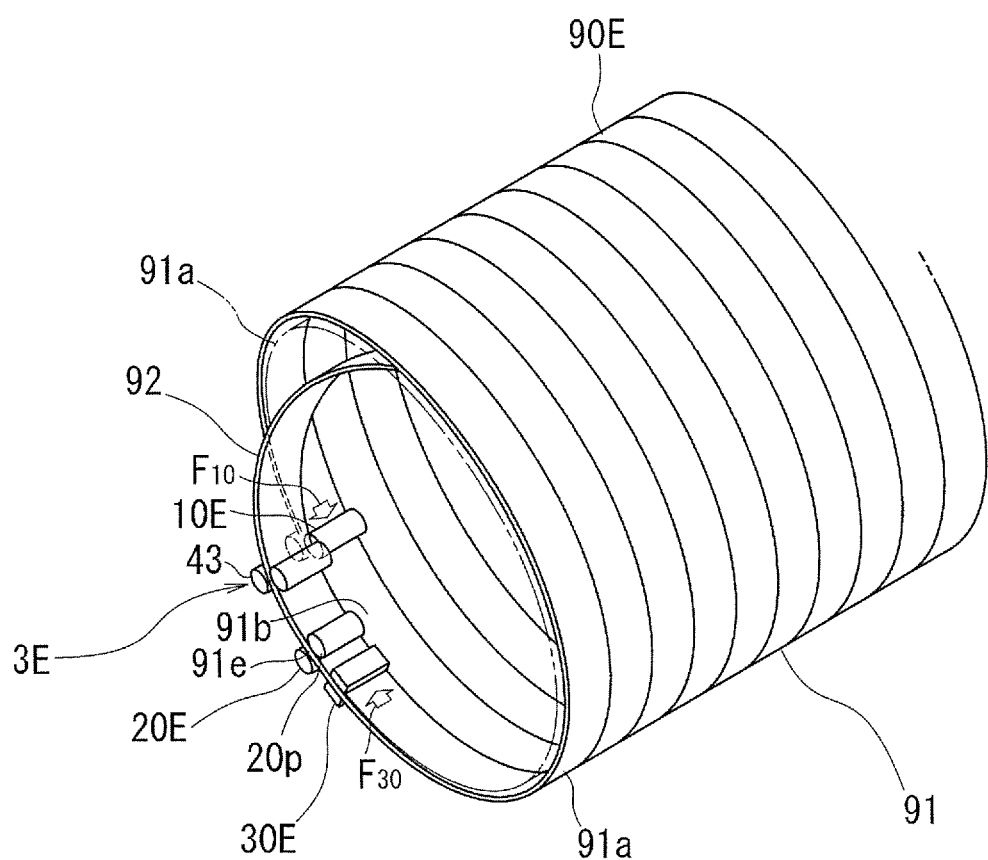
FIG. 12 is a perspective view of a rehabilitation pipe in a process of rehabilitation work according to the fifth embodiment.
Figure 13A:
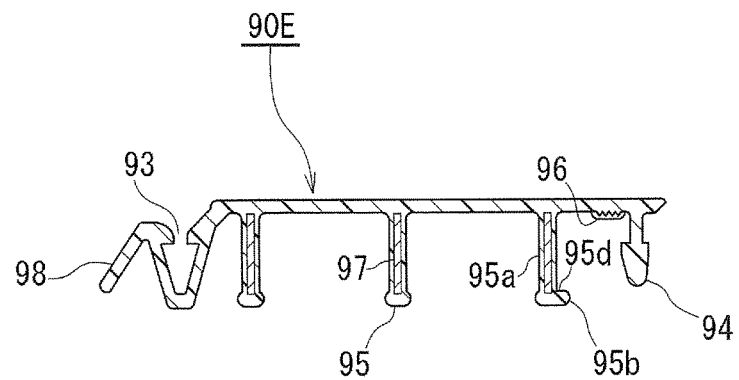
FIG. 13(a) is a cross-sectional view of a strip member that is a structural component of the rehabilitation pipe of the fifth embodiment.

FIGS. 11 to 13 show a fifth embodiment of the present invention. As shown in FIGS. 11 and 12, a pipe-making apparatus 3E according to the fifth embodiment includes a propulsive reaction force imparting portion 10E, a fitting force imparting portion 20E, a resisting force imparting portion 30E and a following strip portion guiding roller 43. The propulsive reaction force imparting portion 10E is disposed in a similar position to the resisting force imparting portion 30 of the first embodiment (FIG. 3). Specifically, the propulsive reaction force imparting portion 10E is disposed spaced from a joining step position 20p in front of the joining step position 20p in a direction of movement of the pipe-making apparatus 3E (leftward in FIG. 11) and is disposed on a distal one-turn portion 91a of a preceding spiral pipe portion 91.

As shown in FIG. 11, the propulsive reaction force imparting portion 10E has a pair of propelling rollers 13E, 13E. An axis of the propelling roller 13E is oriented in a width direction of the pipe-making apparatus 3E (direction orthogonal to the plane of FIG. 11). A length of a shaft of the propelling roller 13E is generally same as a width dimension of a strip member 90E. The preceding spiral pipe portion 91 is caught between the pair of propelling rollers 13E, 13E from an inner peripheral side and an outer peripheral side. A rotational drive mechanism (not shown) such as a motor is connected to at least one of the propelling rollers 13E, 13E. The propelling roller 13E is rotationally driven by the rotational drive mechanism such that the preceding spiral pipe portion 91 is pushed to a returning side (right side in FIG. 11) in a winding direction toward the joining step position 20p.

As shown in FIGS. 11 and 12, a pair of following strip portion guiding rollers 43, 43 are disposed at a position spaced from the propulsive reaction force imparting portion 10E inside with respect to the propulsive reaction force imparting portion 10E in a radial direction of an existing pipe 1 (upper side in FIG. 11). That is to say, the following strip portion guiding roller 43 is disposed at a similar position to the propulsive reaction force imparting portion 10 of the first embodiment (FIG. 3). An axis of the following strip portion guiding roller 43 is oriented to a width direction of the pipe-making apparatus 3E (direction orthogonal to the plane of FIG. 11). The following strip portion guiding roller 43 is freely rotatable about its own axis. It is not required that the following strip portion guiding roller 43 should be connected to a rotational drive mechanism such as a motor. A following strip portion 92 is caught between the pair of following strip portion guiding rollers 43, 43 from opposite sides.

As shown in FIGS. 11 and 12, the fitting force imparting portion 20E is disposed at the joining step position 20p. The fitting force imparting portion 20E has a pair of fitting rollers 23E, 23E. An axis of the fitting roller 23E is oriented in the width direction of the pipe-making apparatus 3E (direction orthogonal to the plane of FIG. 11). A length of a shaft of the fitting roller 23E is generally the same as the width dimension of the strip member 90E. The fitting roller 23E is freely rotatable about its own axis. It is not required that the fitting roller 23E should be connected to a rotational drive mechanism such as a motor. The following strip portion 92 is inserted between the pair of fitting force imparting portions 20E, 20E at the joining step position 20p. Adjacent edges of the following strip portion 92 and an adjacent turn portion 91b of the preceding spiral pipe portion 91 are joined.

As shown in FIGS. 11 and 12, the resisting force imparting portion 30E is disposed at a position spaced from the fitting force imparting portions 20E (joining step position 20p) at the rear with respect to the fitting force imparting portions 20E in the direction of movement of the pipe-making apparatus 3E (rightward in FIG. 11). The propulsive reaction force imparting portion 10E and the resisting force imparting portion 30 are disposed on opposite sides from each other with respect to the joining step position 20p in the direction of movement of the pipe-making apparatus 3E (circumferential direction of the preceding spiral pipe portion 91). The resisting force imparting portion 30E is disposed forward (downstream side) of the propulsive reaction force imparting portion 10E in the winding direction.

As shown in FIG. 13(*b*), as with the first embodiment (FIGS. 1 to 7), the resisting force imparting portion 30E includes a frictionally slidable member 34 on the inner peripheral side and a frictionally slidable member 35 on the outer peripheral side. Width dimensions of the frictionally slidable members 34, 35 (right-left dimension in FIG. 13(*b*)) are generally the same as or shorter than the width dimension of the strip member 90E. A distal one-turn portion 91a of the preceding spiral pipe portion 91 is caught between the frictionally slidable members 34, 35. A sub lock setting protrusion 32 is disposed in one end portion (right end portion in FIG. 13(*b*)) of the frictionally slidable member 35 on the outer peripheral side in the width direction such that the sub lock setting protrusion 32 is protruded toward the inner periphery (upper side in FIG. 13(*b*)) of the preceding spiral pipe portion 91.

As shown in FIG. 13(*a*), an extended edge portion 98 is formed in the strip member 90E of the fifth embodiment. The extended edge portion 98 obliquely extends from a first fitting portion 93 toward outside in a width direction (right-left direction in FIG. 13) of the strip member 90E and outside (under side in FIG. 13) in a radial direction of a rehabilitation pipe 9. As shown in FIG. 13(*b*), the extended edge portion 98 is fitted into a step 95d between a main portion 95a and a protruded portion 95b of adjacent turns of a reinforcement rib 95 of the rehabilitation pipe 9.

The first fitting portion 93 and a second fitting portion 94 fitted together constitute a main lock 9a.

The extended edge portion 98 and the step 95d fitted together constitute a sub lock 9b.

In the fifth embodiment, the rehabilitation pipe 9 is made into a pipe in the following manner.

As shown in FIG. 11, the propelling rollers 13E, 13E of the propulsive reaction force imparting portion 10E are rotationally driven to push the preceding spiral pipe portion 91 to the returning side (right side in FIG. 11) in the winding direction toward the joining step position 20p. By the propulsive reaction force $F_{10}$, the pipe-making apparatus 3E is moved forward in a direction of movement in the winding direction (left direction in FIG. 11) with respect to the preceding spiral pipe portion 91 that is fixed.

As the pipe-making apparatus 3E is moved forward, the following strip portion 92 is successively fed between the fitting rollers 23E (joining step position 20p) of the fitting force imparting portion 20E. The second fitting portion 94 of the following strip portion 92 is fitted with the first fitting portion 93 of the adjacent turn portion 91b of the preceding spiral pipe portion 91, and the main lock 9a is locked. The extended edge portion 98 of the adjacent turn portion 91b is hooked to a distal end portion of the protruded portion 95b of the following strip portion 92. In the fitting force imparting portion 20E, the extended edge portion 98 is not moved far enough to be fitted to the step 95d, and the sub lock 9b is not locked.

As the pipe-making apparatus 3E is moved forward, the resisting force imparting portion 30E is frictionally slid along the preceding spiral pipe portion 91. Thereby, a resisting force $F_{30}$ in a direction opposite to the direction of the propulsive reaction force $F_{10}$ in the winding direction, i.e. toward forward in the winding direction (left side in FIG. 11) is imparted to the preceding spiral pipe portion 91. An imparting position of the resisting force $F_{30}$ in the preceding spiral pipe portion 91 is forward (downstream side) of an imparting position of the propulsive reaction force $F_{10}$ in the winding direction. As a result, a diameter-shrinking effect can work on the preceding spiral pipe portion 91, contrary to the first embodiment (FIG. 3). As indicated by chain double-dashed lines in FIG. 13(b), the fitting portions 93, 94 of the main lock 9a can be slid in the winding direction (circumferential direction of the preceding spiral pipe portion 91) since the sub lock 9b is not in a locked state between the fitting force imparting portion 20E and the resisting force imparting portion 30E. Thereby, the diameter-shrinking effect can be surely obtained.

Figure 13B:
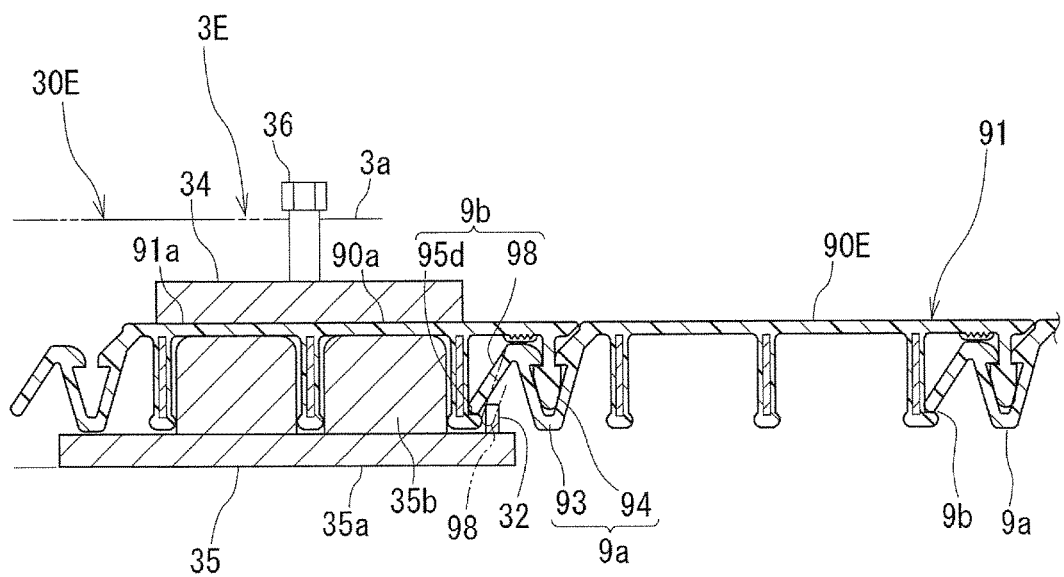
FIG. 13(b) is a cross-sectional view of a resisting force imparting portion of the pipe-making apparatus of the fifth embodiment, taken along line XIIIb-XIIIb of FIG. 11.

Then at the resisting force imparting portion 30E, the sub lock setting protrusion 32 presses the extended edge portion 98 toward the inner peripheral side (upper side in FIG. 13(b)). Thereby, as indicated by the solid lines in FIG. 13(b), the extended edge portion 98 is fitted into the step 95d. Thereby, the sub lock 9b is locked. As a result, the slipping can be restrained in an upstream side (returning side) in the winding direction with respect to the resisting force imparting portion 30E.

In the pipe-making apparatus 3E, when the strip member 90E has a tendency to have the diameter thereof expanded, for example, the expansion of the diameter can be restrained.

Figure 14:
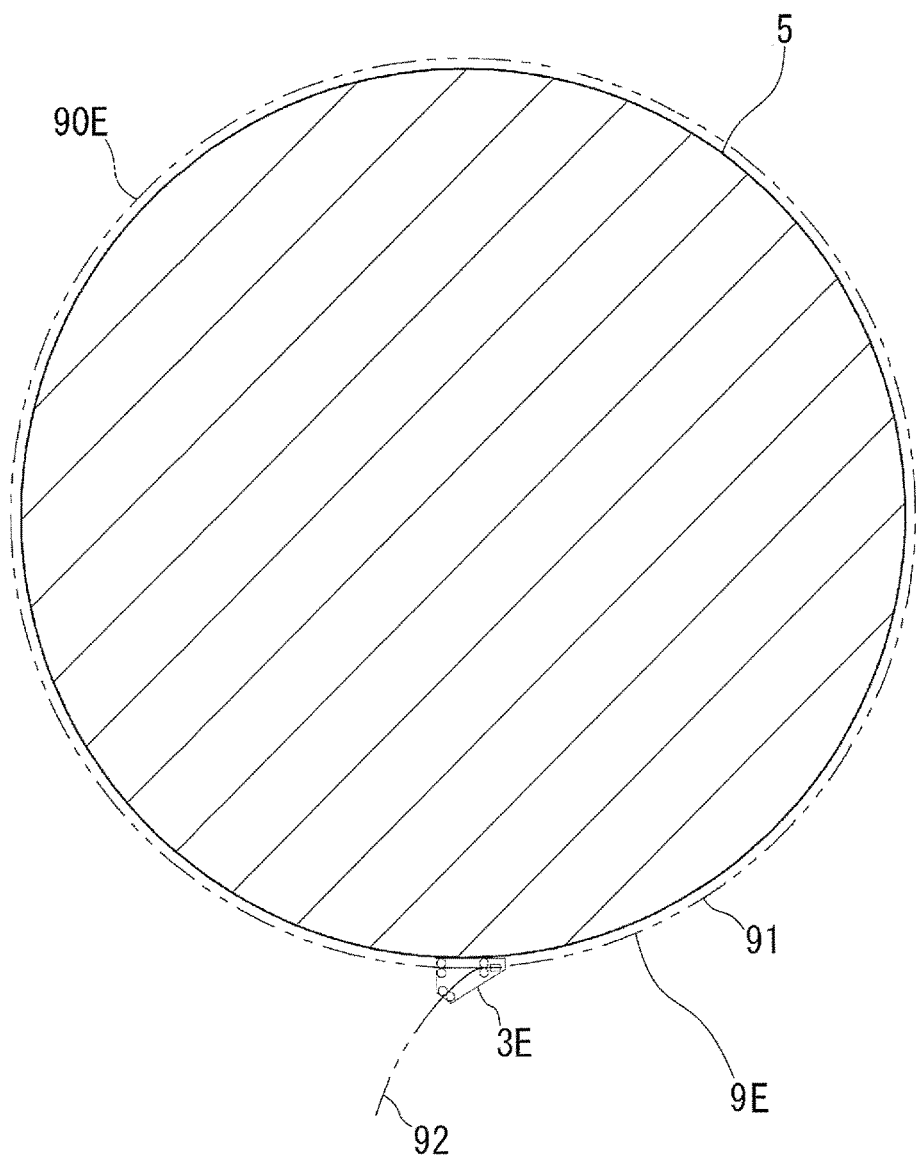
FIG. 14 is a cross-sectional view showing a modified embodiment of the fifth embodiment, in which the pipe-making apparatus is applied to an outer wall structure of a pillar.

Furthermore, as shown in FIG. 14, when a rehabilitation pipe 9E is to be provided on an outer peripheral surface of a pole 5, for example, the strip member 90E can be spirally wound around the outer peripheral surface of the pole 5 in a closely contacted manner by using the pipe-making apparatus 3E.

Sixth Embodiment

Figure 15:
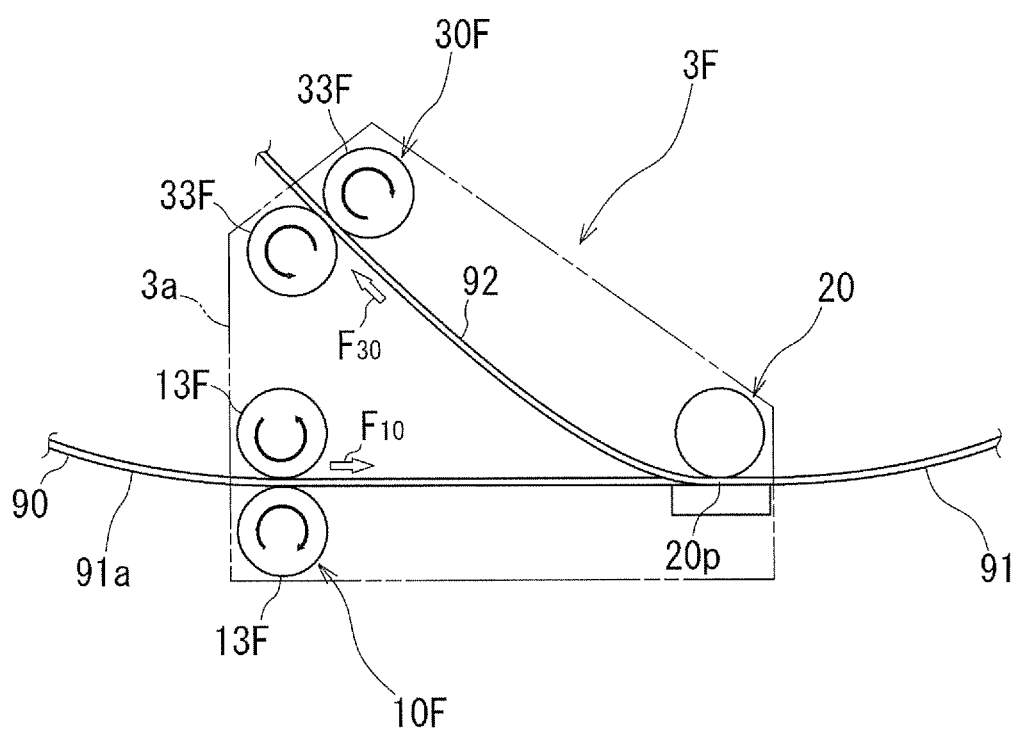
FIG. 15 is a front view diagrammatically showing a pipe-making apparatus according to a sixth embodiment of the present invention.

FIG. 15 shows a sixth embodiment of the present invention. A pipe-making apparatus 3F according to the sixth embodiment includes a propulsive reaction force imparting portion 10F, a fitting force imparting portion 20 and a resisting force imparting portion 30F. As with the propulsive reaction force imparting portion 10E of the fifth embodiment (FIG. 11), the propulsive reaction force imparting portion 10F has a pair of propelling rollers 13F, 13F and the propulsive reaction force imparting portion 10F is disposed spaced from a joining step position 20p of the fitting force imparting portion 20 in front of the joining step position 20p (left side in FIG. 15) in a direction of movement of the pipe-making apparatus 3F. A preceding spiral pipe portion 91 is caught between the propelling rollers 13F, 13F. The propelling roller 13F is rotationally driven by a rotational drive mechanism (not shown) so as to push the preceding spiral pipe portion 91 toward the joining step position 20p. With the pressing force working as a reaction force, the pipe-making apparatus 3F is propelled leftward in FIG. 15.

The resisting force imparting portion 30F is disposed at the same position as the propulsive reaction force imparting portion 10 of the first embodiment (FIG. 3). Specifically, the resisting force imparting portion 30F is located spaced from the joining step position 20p in front of the joining step position 20p (left side in FIG. 15) in the direction of movement of the pipe-making apparatus 3F and in a radial direction (vertical direction in FIG. 15) of the preceding spiral pipe portion 91. A following strip portion 92 is caught between the pair of resisting rollers 33F, 33F of the resisting force imparting portion 30F. The resisting roller 33F is rotationally driven by the rotational drive mechanism (not shown) so as to push the following strip portion 92 in a direction opposite to the joining step position 20p.

Thereby, a diameter-shrinking effect can be imparted to the preceding spiral pipe portion 91.

The pipe-making apparatus 3F (FIG. 15) is substantially the same as the pipe-making apparatus 3C of the third embodiment (FIG. 8) in structure. By reversing the rotating directions of the propelling roller 13 and the resistive rollers 33 of the pipe-making apparatus 3C (FIG. 8), the pipe-making apparatus 3F (FIG. 15) can be attained. Accordingly, by using one pipe-making apparatus 3C, the diameter-expanding effect and the diameter-shrinking effect can be exerted by rotating the propelling roller 13 and the resistive rollers 33 normally or reversely.

Seventh Embodiment

Figure 16A:
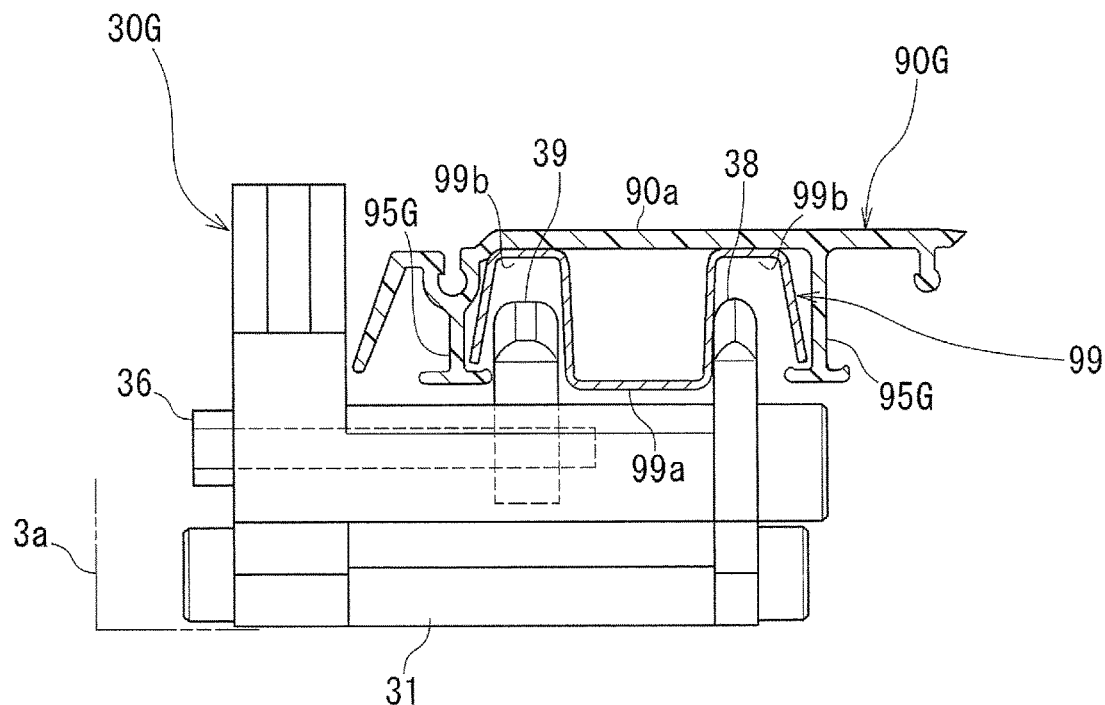
FIG. 16(a) is a side view of a resisting force imparting portion of a pipe-making apparatus according to a seventh embodiment of the present invention, showing the resisting force imparting portion in a resisting force releasing state.
Figure 16B:
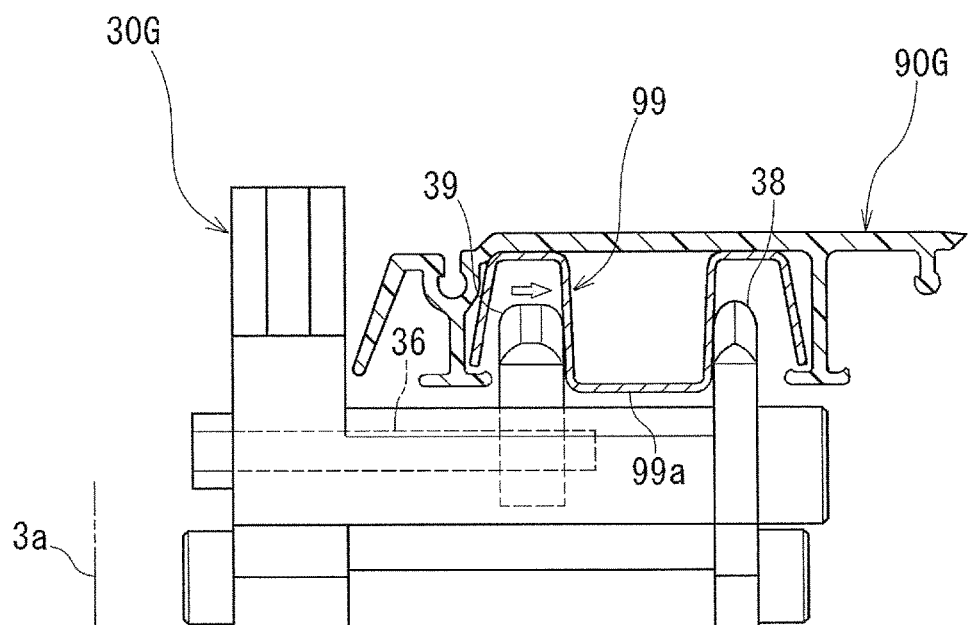
FIG. 16(b) is a side view of the resisting force imparting portion according to the seventh embodiment, showing the resisting force imparting portion in a resisting force imparting state.
Figure 17:
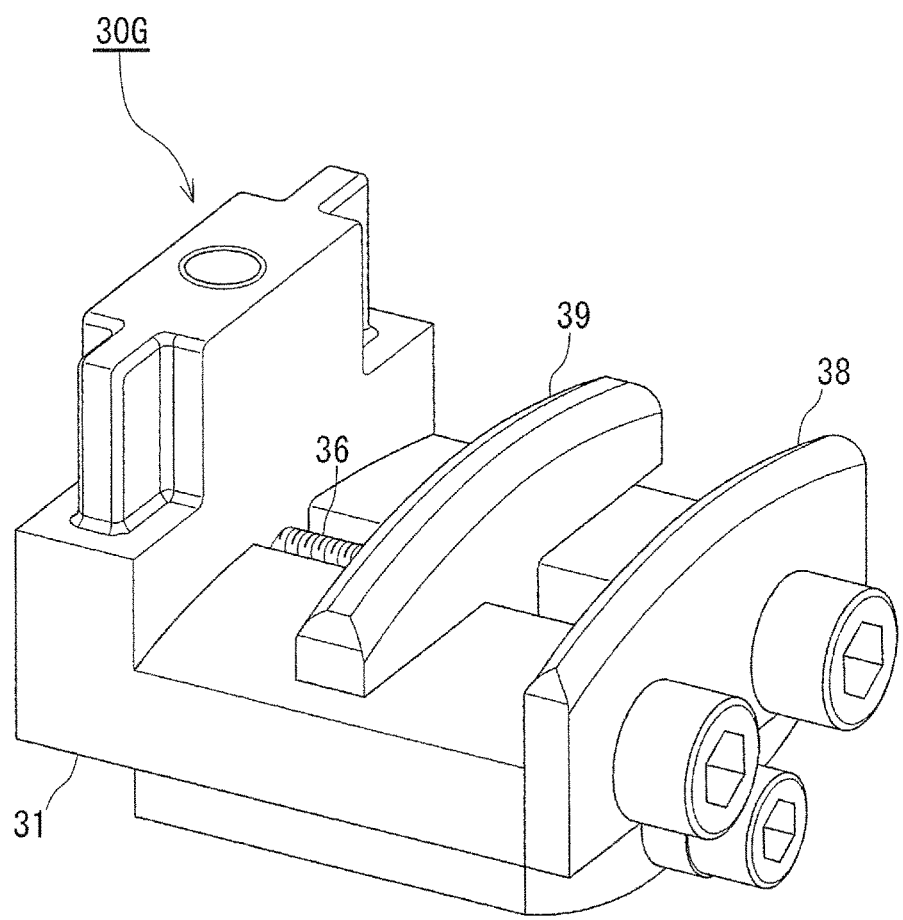
FIG. 17 is a perspective view of the resisting force imparting portion according to the seventh embodiment.

FIGS. 16 and 17 show a seventh embodiment of the present invention. The seventh embodiment is a modified embodiment in which the resisting force imparting portion and the strip member are modified.

As shown in FIG. 16(a), a strip member 90G of the seventh embodiment is provided with a reinforcement strip 99. The reinforcement strip 99 is made of a metal plate such as a steel plate. The reinforcement strip 99 has a generally M-shaped cross-section. Specifically, the reinforcement strip 99 includes a pair of grooves 99b, 99b and a central convex frame portion 99a having a U-shaped cross-section between the grooves 99b, 99b. The reinforcement strip 99 is fitted between two reinforcement ribs 95G of the strip member 90G.

As shown in FIG. 16(a) and FIG. 17, a resisting force imparting portion 30G of the seventh embodiment has a body 31 and a pair of frictionally slidable members 38, 39. The body 31 is fixed to a body frame 3a. A fixed frictionally slidable member 38 and a movable frictionally slidable member 39 are protruded from the body 31 toward the strip member 90G. The fixed frictionally slidable member 38 and the movable frictionally slidable member 39 are spaced from each other in a width direction of the body 31 (right-left direction in FIG. 16). The fixed frictionally slidable member 38 is fixed to the body 31. The movable frictionally slidable member 39 is slidable in the width direction of the body 31, thereby movable toward and away from the fixed frictionally slidable member 38. The body 31 is provided with a resisting force adjustment bolt 36 (resisting force adjustment means). Position of the movable frictionally slidable member 39 in the width direction of the body 31 can be adjusted by the resisting force adjustment bolt 36.

As shown in FIG. 16(a), the resisting force imparting portion 30G is disposed on an outer peripheral side (under side in FIG. 16) of the strip member 90G. The fixed frictionally slidable member 38 and the movable frictionally slidable member 39 are respectively inserted in the pair of grooves 99b of the reinforcement strip 99.

As shown in FIG. 16(b), the movable frictionally slidable member 39 is moved closer to the fixed frictionally slidable member 38 by the resisting force adjustment bolt 36, and thereby the frictionally slidable members 38, 39 are respectively pressed against opposite side portions of the central convex frame portion 99a of the. As a result, friction is generated between the reinforcement strip 99 and the frictionally slidable members 38, 39, and a resisting force $F_{30}$ acts therebetween.

The resisting force imparting portion 30G may be provided with a fluid pressure cylinder 37 (refer to FIG. 7) instead of the resisting force adjustment bolt 36, and the pressing force of the movable frictionally slidable member 39 and thereby the resisting force $F_{30}$ of the movable frictionally slidable member 39 may be adjusted by the fluid pressure cylinder 37.

The present invention is not limited to the embodiments described above and various modifications can be made.

For example, the propulsive reaction force imparting portion may be disposed in the following strip portion 92. In this case, the resisting force imparting portion may be disposed in the following strip portion 92 at a point closer to the joining step position 20p than the propulsive reaction force imparting portion.

The body frame 3a may be provided with retainer (first and second retainer portions) for positioning and for preventing rotation.

Components of multiple embodiments may be combined. For example, the resisting force imparting portion 30 of the fourth embodiment (FIG. 9) may be used in place of the resisting force imparting portion 30C of the third embodiment (FIG. 8).

The fitting force imparting portion 20E of the fifth embodiment (FIG. 11) may be used as the fitting force imparting portion in other embodiments.

The strip member 90E (FIG. 13) of the fifth embodiment may be used as the strip member in embodiments other than the fifth embodiment. A strip member 90 (FIG. 4) similar to the strip member of the first embodiment, etc. may be used as the strip member in the fifth embodiment.

The resisting force imparting portion 30G of the seventh embodiment (FIG. 16) may be used as the resisting force imparting portion in the first to the sixth embodiments.

As a modification of the fifth embodiment (FIG. 11), the location of the resisting force imparting portion 30E in the preceding spiral pipe portion 91 may be moved to the returning side (upstream side) in the winding direction with respect to the location of the propulsive reaction force imparting portion 10E so that the diameter-expanding effect may be imparted to the preceding spiral pipe portion 91.

As a modification of the fifth embodiment (FIG. 11), the propulsive reaction force imparting portion 10E and the resisting force imparting portion 30E may be disposed on the same side (preferably, in front in the direction of movement) in the circumferential direction of the spiral pipe 9 with respect to the joining step position 20p.

A joining portion corresponding to the fitting portions 93, 94 of the strip member 90 may be manufactured as a separate component independent of the strip body 90a. The joining portion may be joined with the strip body 90a before the pipe-making or during the pipe-making. The joining portion may extend over edges of adjacent turns of the strip body 90a and may be joined with these edges.

INDUSTRIAL APPLICABILITY

The present invention may be applied to a rehabilitation work of an aged existing pipe such as a sewer pipe, a water supply pipe, an agricultural water pipe and a gas pipe.

EXPLANATION OF REFERENCE NUMERALS $F_{10}$ propulsive reaction force
$F_{30}$ resisting force
3, 3C to 3F pipe-making apparatus
9, 9E rehabilitation pipe (spiral pipe)
10, 10E, 10F propulsive reaction force imparting portion
20p joining step position
25b first retainer portion
30, 30C to 30G resisting force imparting portion
33 resistive roller (frictionally slidable member)
34 frictionally slidable member on the inner peripheral side (frictionally slidable member)
35 frictionally slidable member on the outer peripheral side (frictionally slidable member)
35b frictionally slidable block (second retainer portion)
38 fixed frictionally slidable member (frictionally slidable member)
39 movable frictionally slidable member (frictionally slidable member)
90, 90E, 90G strip member
91 preceding spiral pipe portion
92 following strip portion

The invention claimed is:

1. A pipe-making apparatus for forming a spiral pipe by joining edges of adjacent turns of a strip member while spirally winding the strip member along a winding direction, the apparatus comprising:
a body frame movable along the winding direction;
a propulsive reaction force imparting portion having a pair of propelling rollers disposed on an upper portion of the body frame and spaced from a joining step position at which the joining is performed on a bottom portion of the body frame and a motor connected to and drivably rotating at least one of the propelling rollers, the propulsive reaction force imparting portion imparting a propulsive reaction force for moving the body frame forward in the winding direction to a following strip portion of the strip member being caught between the pair of propelling rollers, the following strip portion following the preceding spiral pipe portion precedingly made into a pipe; and
a resisting force imparting portion having a friction plate or a pair of resistive rollers disposed on a same position in the winding direction and catching the preceding spiral pipe portion from inner and outer sides on the same position, the resisting force imparting portion disposed on the bottom portion spaced from the propulsive reaction force imparting portion, the resisting force imparting portion imparting a resisting force along the winding direction to the strip member by friction between the strip member and the friction plate or the resistive rollers rotated reversely or slowly with respect to the propelling rollers when the body frame is being propelled by the propulsive reaction force, a direction of the resisting force being opposite to a direction of the propulsive reaction force.

2. The pipe-making apparatus according to claim 1, wherein the resisting force is set at a magnitude that allows the pipe-making apparatus to be propelled and that allows the preceding spiral pipe portion to change its diameter.

3. The pipe-making apparatus according to claim 1, wherein the resisting force of the resisting force imparting portion is adjustable in a stepped fashion or a stepless fashion.

4. The pipe-making apparatus according to claim 1, wherein the propulsive reaction force imparting portion pushes the following strip portion from in front of the joining step position in a direction of movement toward the joining step position, and wherein the resisting force imparting portion imparts the resisting force toward forward in the winding direction to the preceding spiral pipe portion.

5. The pipe-making apparatus according to claim 1, wherein the propulsive reaction force imparting portion imparts the propulsive reaction force toward a returning side in the winding direction to the preceding spiral pipe portion, and wherein the resisting force imparting portion imparts the resisting force toward forward in the winding direction to a portion of the preceding spiral pipe portion spaced from the propulsive reaction force imparting portion in the winding direction.

6. The pipe-making apparatus according to claim 1, wherein the propulsive reaction force imparting portion and the resisting force imparting portion are disposed on the same side with each other in the direction of movement with respect to the joining step position.

7. The pipe-making apparatus according to claim 1, further comprising a retainer that is held so as to be movable with respect to the preceding spiral pipe portion in the winding direction and immovable with respect to the preceding spiral pipe portion in a width direction orthogonal to the winding direction, wherein the retainer includes a first retainer portion and a second retainer portion spaced from each other in the winding direction.

\* \* \* \* \*